United States Patent
Yokota et al.

(10) Patent No.: US 9,492,794 B2
(45) Date of Patent: Nov. 15, 2016

(54) POROUS HOLLOW FIBER MEMBRANE FOR TREATMENT OF PROTEIN-CONTAINING LIQUID

(75) Inventors: Hideyuki Yokota, Osaka (JP); Toru Uenishi, Ohtsu (JP); Hirofumi Ogawa, Ohtsu (JP); Satoru Ashitaka, Ohtsu (JP); Noriko Monden, Ohtsu (JP)

(73) Assignee: TOYOBO BOSEKI KABUSHIKI KAISHA, Osaka-shi (JP)

( * ) Notice: Subject to any disclaimer, the term of this patent is extended or adjusted under 35 U.S.C. 154(b) by 495 days.

(21) Appl. No.: 13/578,416

(22) PCT Filed: Mar. 8, 2011

(86) PCT No.: PCT/JP2011/055299
§ 371 (c)(1),
(2), (4) Date: Aug. 10, 2012

(87) PCT Pub. No.: WO2011/111679
PCT Pub. Date: Sep. 15, 2011

(65) Prior Publication Data
US 2012/0305472 A1    Dec. 6, 2012

(30) Foreign Application Priority Data

Mar. 9, 2010 (JP) ................................. 2010-051559

(51) Int. Cl.
B01D 69/02    (2006.01)
B01D 69/08    (2006.01)
(Continued)

(52) U.S. Cl.
CPC ............... *B01D 69/02* (2013.01); *B01D 69/08* (2013.01); *B01D 69/087* (2013.01); *B01D 71/44* (2013.01);
(Continued)

(58) Field of Classification Search
None
See application file for complete search history.

(56) References Cited

U.S. PATENT DOCUMENTS

2004/0026315 A1    2/2004  Han et al.
2006/0016748 A1    1/2006  Koguma et al.
(Continued)

FOREIGN PATENT DOCUMENTS

JP    04-050054 B2    8/1992
JP    11-332980 A    12/1999
(Continued)

OTHER PUBLICATIONS

Dispatch No. 1047 for Drugs, 1999, Notification from Department of Drug Safety, Ministry of Health and Welfare to the President of the Japan Blood Products Associations, w/ English abstract.
(Continued)

*Primary Examiner* — Vickie Kim
*Assistant Examiner* — Ryan B Huang
(74) *Attorney, Agent, or Firm* — Westerman, Hattori, Daniels & Adrian, LLP

(57) ABSTRACT

An object of the present invention is to provide a porous hollow fiber membrane for the treatment of a protein-containing liquid where the substances to be removed such as small-sized virus contained in a solution can be efficiently separated and removed and, at the same time, useful substances to be recovered such as protein can be efficiently permeated and the decrease in the permeation characteristics thereof with elapse of time is small. The porous hollow fiber membrane for the treatment of a protein-containing liquid of the present invention is characterized in that the membrane comprises a hydrophobic polymer and a hydrophilic polymer, its permeability for pure water is 10 to 300 L/(h·m²·bar) and, when a 0.5% immunoglobulin solution is subjected to filtration at a constant pressure of 1.0 bar for 60 minutes in dead-end filtration mode, its filtration time and accumulated amount of recovered filtrate are substantially in a linear relation.

10 Claims, 4 Drawing Sheets

(51) Int. Cl.
*B01D 71/44* (2006.01)
*B01D 71/68* (2006.01)

(52) U.S. Cl.
CPC ......... *B01D 71/68* (2013.01); *B01D 2325/026* (2013.01); *B01D 2325/20* (2013.01); *B01D 2325/28* (2013.01); *B01D 2325/36* (2013.01)

(56) References Cited

U.S. PATENT DOCUMENTS

| | | | |
|---|---|---|---|
| 2006/0108288 A1* | 5/2006 | Oishi | 210/639 |
| 2006/0117949 A1* | 6/2006 | Kulkarni et al. | 95/45 |
| 2008/0044643 A1* | 2/2008 | Yokota et al. | 428/308.4 |
| 2009/0110900 A1 | 4/2009 | Yokota et al. | |
| 2010/0190965 A1 | 7/2010 | Yamaguchi et al. | |
| 2010/0219122 A1 | 9/2010 | Ogawa et al. | |

FOREIGN PATENT DOCUMENTS

| | | |
|---|---|---|
| JP | 2007-136449 A | 6/2007 |
| JP | 2008-094722 A | 4/2008 |
| JP | 2008-237987 A | 10/2008 |
| WO | 03/026779 A1 | 4/2003 |
| WO | 2004/035180 A1 | 4/2004 |
| WO | 2005/025649 A1 | 3/2005 |
| WO | 2008/156124 A1 | 12/2008 |
| WO | 2009/051168 A1 | 4/2009 |
| WO | 2009/104705 A1 | 8/2009 |
| WO | 2009/141965 A1 | 11/2009 |

OTHER PUBLICATIONS

PDA Journal of GMP and Validation in Japan, 2005, vol. 7, No. 1, p. 44-54, w/ English abstract.
Murai, Katsushi et al., The practical protocols on viral clearance study for the application PDA Japan, Bio-virus safety committee, viral clearance subcommittee, PDA Journal of GMP and Validation in Japan, 2007, vol. 9, No. 1, p. 6-31, w/ English abstract.
International Search Report of PCT/JP2011/055299, mailing date of Jun. 14, 2011.
Extended European Search Report dated Apr. 8, 2015, issued in corresponding EP Patent Application No. 11753337.2 (10 pages).

* cited by examiner

POROUS HOLLOW FIBER MEMBRANE FOR TREATMENT OF PROTEIN-CONTAINING LIQUID

TECHNICAL FIELD OF THE INVENTION

The present invention relates to a porous hollow fiber membrane for the treatment of a protein-containing liquid which is suitable for the separation of fine particles such as virus contained in an aqueous fluid such as a protein solution. To be more specific, it relates to a porous hollow fiber membrane for the treatment of a protein-containing liquid which is characterized in that the membrane preferably comprises a hydrophobic polymer and a hydrophilic polymer, its permeability for pure water is 10 to 300 L/(h·m$^2$·bar) and, when a 0.5% immunoglobulin solution is subjected to filtration at a constant pressure of 1.0 bar for 60 minutes in dead-end filtration mode, its filtration time and accumulated amount of recovered filtrate are substantially in a linear relation.

BACKGROUND ART

Hollow fiber membranes for a purpose of treatment of aqueous fluids have been widely utilized for industrial use such as microfiltration or ultrafiltration and for medical use such as hemodialysis, hemofiltration or hemodiafiltration. Particularly in recent years, there has been a demand for a technology for removing pathogenic substances such as virus from a solution of protein which is a useful ingredient during the steps for the manufacture of biopharmaceuticals and blood products so as to enhance the safety.

According to Non-Patent Document 1, it is said to be desirable, with regard to the steps of removal and inactivation of virus in a blood plasma protein fraction preparation, to incorporate not less than two different viral inactivation and removal steps. According to the description of Non-Patent Document 2, it is mentioned that the LRV to be achieved as the target value is about 4. Further, according to Non-Patent Document 3, there is a clear description in this document reading "Particularly with regard to the steps of removal and inactivation of virus, 'it is desirable to consider not less than two different viral inactivation and removal steps' in 'Guideline for securing safety of blood plasma protein fraction preparations against virus' (Dispatch No. 1047 for Drugs (Aug. 30, 1999)) and, with regard to the specific virus, it is requested that the sum of virus clearance indexes in the manufacturing steps (total virus clearance indexes) is 9 or more." Incidentally, the above term LRV has nearly the same meaning as the virus clearance index R which is mentioned as follows in Non-Patent Document 1.

Virus clearance index $R=\log((V1 \times T1)/(V2 \times T2))$

V1 Volume before the treatment of the step
T1 Titer of virus before the treatment of the step
V2 Volume after the treatment of the step
T2 Titer of virus after the treatment of the step As to a method for removal/inactivation of virus, there are a heating treatment, an optical treatment such as irradiation of gamma ray or ultraviolet ray, a chemical treatment such as a low-pH treatment, a precipitating fractionation such as fractionation by ethanol or fractionation by ammonium sulfate, a filtration by membrane, etc. and, in the removal of virus from a protein solution, a method of filtering by membrane which does not result in the denaturation of protein is attracting public attention.

On the other hand, in the steps for the manufacture of biopharmaceuticals and blood products, protein which is a useful ingredient should be efficiently permeated and recovered in view of the productivity. However, when the object for the separation and removal is a small-sized virus such as parvovirus, it has been difficult to simultaneously satisfy both of the removing characteristic for virus and the permeating characteristic for useful protein.

In Patent Document 1, there is a disclosure for a hydrophilic microporous membrane where the relation among an average permeability during 5 minutes from the start of filtration (globulin permeability A), an average permeability during 5 minutes since the stage being elapsed 55 minutes from the start of filtration (globulin permeability B), and the maximum pore size when 3 wt % bovine immunoglobulin where the percentage of the monomer is not less than 80 wt % is subjected to a low-pressure filtration at 0.3 MPa is expressed in terms of parameters. The constituent features of this membrane are as follows.

(1) Maximum pore size 10 to 100 nm
(2) Globulin permeability A>0.015×maximum pore size (nm)$^{2.75}$
(3) Globulin permeability B/globulin permeability A>0.2

Now, as mentioned in lines 21 to 27, page 3 of Patent Document 1, the requirement (1) merely mentions the pore size which is necessitated for the removal of infectious virus. The requirement (2) demands that the globulin permeability A is more than the value calculated from the maximum pore size of the micropore and, since it is obvious in a membrane for a purpose of removing the virus from a protein solution that the more the permeability for the protein solution, the better, it merely mentions the aimed characteristics. The requirement (3) demands that the permeability for a protein solution does not lower with elapse of time and that is also a mere description for the aimed characteristics which is demanded in the membrane where the removal of virus from a protein solution is a target. Besides the above, there are descriptions in subclaims for a hydrophilic microporous membrane where the logarithmic removal rate to porcine parvovirus is 3 or more, for a hydrophilic microporous membrane where the accumulated permeation amount during 3 hours from the start of filtration when 3 wt % bovine immunoglobulin where the ratio of the monomer is not less than 80 wt % is subjected to a low-pressure filtration at 0.3 MPa is not less than 50 liters/m$^2$, etc. However, they merely mention the aimed characteristics of the membrane for a purpose of removal of virus from a protein solution that the virus is efficiently removed and the permeation amount of the protein solution is high. They do not give useful and specific information for an object to obtain a membrane having a high permeation of protein and a high removal of virus.

When (3) is considered in detail, when the ratio of the permeability after 55 minutes from the start of filtration to that immediately after the start of filtration merely becomes high, such a thing does not always consistent to the fact that permeability for the protein solution does not lower with elapse of time. For example, it is also thinkable the case where permeability for the protein solution gradually decreases with elapse of the filtration time but, at a certain point in time, defect is resulted in the membrane structure and, as a result, the permeability suddenly changes to increase. In that case, there may be also the case as a result that the permeability after 55 minutes from the start of filtration becomes high whereupon the ratio of the both exceeds 0.2. However, it cannot be absolutely said that a membrane showing the behavior as such achieves an object to obtain a membrane having a high permeation of protein and a high removal of virus.

Patent Document 1 discloses a microporous membrane which has a coarse and big structure layer having a big porosity and a dense layer having a small porosity. To begin with, the discussion made therein is for a hollow fiber membrane made of poly(vinylidene fluoride) (hereinafter, it will be abbreviated as PVDF) which is apt to form a homogeneous structure by means of thermally induced phase separation. Thus, it is difficult to directly apply such an art, for example, to a raw material such as a polysulfone type resin which has been widely used as a material for the hemodialysis membrane due to its high water permeation ability.

Patent Document 2 discloses a microporous membrane which has a coarse structure layer having a big porosity and a dense layer having a small porosity but, again, the thing predicted as a material herein is PVDF. PVDF is excellent in terms of physical strength but, on the other hand, since it is a hydrophobic material, it is apt to result in adsorption of protein, etc. and also in staining and blocking of the membrane whereupon the filtration rate quickly lowers. In order to improve such an undesirable characteristics, it is necessary to make the membrane hydrophilic but, generally, a membrane made from PVDF is to be modified to a hydrophilic one by means of post-treatment after preparing the membrane. Thus, as compared with the polysulfone resin where it is usual to make into the membrane in a blended state with hydrophilic polymer, there is a disadvantage that manufacturing steps become troublesome.

Patent Document 3 discloses an ultrafiltration membrane for retaining the virus having the initial LRV, to PhiX 174, of at least 4.0 and having a surface which has been made hydrophilic with hydroxyalkyl cellulose. In the art disclosed therein, hydrophilization is conducted by a specific hydrophilic polymer and is lacking in broad applicability. Although a blend of polysulfone, etc. with a hydrophilic polymer such as polyvinylpyrrolidone is also exemplified, a hydrophilizing treatment using hydroxyalkyl cellulose is still inevitable. Further, although a hollow fiber type is allowed as well, a flat sheet type is predicted and there is no sufficient explanation for preparing a hollow fiber membrane type.

Patent Document 4 discloses a method for the manufacture of an immunoglobulin preparation which effectively removes the virus and also does not cause hindrance for the filtration such as clogging of the removing membrane due to aggregates and contaminated protein in industrial production process. This method comprises a step where immunoglobulin solution is filtered using a porous membrane having an average pore size of 15 to 20 nm. There is a description reading that, as to a material for the porous membrane, regenerated cellulose is preferably exemplified. Further, in FIGS. 1 to 3, there are shown graphs where the accumulated filtrate amount spreads almost linearly against the elapsed time. It is of course thinkable that, when filtration is conducted using Planova 20N (Asahi Kasei Pharma) which is a virus-removing membrane made of regenerated cellulose mentioned in Example 1, such behavior will be noted. The above is greatly due to the affection by the use of a very highly hydrophilic regenerated cellulose material. In fact, it was very difficult to obtain a membrane showing such a linear filtration behavior in a synthetic membrane comprising hydrophobic polymer and hydrophilic polymer. In a cellulose membrane, strength in its wet state with water is low. Thus, there is such a disadvantage that it is difficult to set high filtering pressure whereby high permeability cannot be achieved.

Patent Document 5 discloses a macromolecular porous hollow fiber membrane having such a pore structure that, from the inner wall surface to the inside wall, the in-plane porosity decreases initially and, after at least one minimum area, it increases again in the outer wall area. It also discloses a method for removal of virus where an aqueous solution of protein is filtered using said membrane. When the membrane structure disclosed herein is briefly mentioned, it is a hollow fiber membrane where the pore size of the membrane wall becomes in the order of rough-dense-rough in the membrane thickness direction. It has been said to be suitable for the removal of virus in high efficiency and the recovery of protein in high permeation efficiency without denaturing protein that there are such an inclined structure and the specific average pore size. Although various macromolecular substances are exemplified as the material, the art disclosed in Patent Document 5 is substantially an art using regenerated cellulose and it is difficult to widely develop the art disclosed therein for many materials. Further, the disadvantages of a cellulose material were as mentioned already.

PRIOR ART DOCUMENTS

Patent Documents

Patent Document 1: WO 2004/035180
Patent Document 2: WO 2003/026779
Patent Document 3: Japanese Patent Application Laid-Open (JP-A) No. 2007-136449
Patent Document 4: Japanese Patent Application Laid-Open (JP-A) No. 2008-094722
Patent Document 5: Japanese Patent Pregrant Publication (JP-B) No. 050054/92

Non-Patent Documents

Non-Patent Document 1: Dispatch No. 1047 for Drugs (Aug. 30, 1999) (Notification from Department of Drug Safety, Ministry of Health and Welfare to the President of the Japan Blood Products Association)
Non-Patent Document 2: PDA Journal of GMP and Validation in Japan, Vol. 7, No. 1, p. 44 (2005)
Non-Patent Document 3: PDA Journal of GMP and Validation in Japan, Vol. 9, No. 1, p. 6 (2007)

DISCLOSURE OF THE INVENTION

Problem that the Invention is to Solve

An object of the present invention is to provide a porous hollow fiber membrane for the treatment of a protein-containing liquid where the substances to be removed such as virus contained in a solution can be efficiently separated and removed and, at the same time, useful substances to be recovered such as protein can be efficiently permeated and the decrease in the permeation characteristics thereof with elapse of time is small.

Means for Solving the Problem

The present inventors have conducted an intensive investigation for solving the above problem and have solved the problem by using specific constitutions whereupon the present invention has been achieved.

Thus, the porous hollow fiber membrane for the treatment of a protein-containing liquid of the present invention is characterized in (1) that the membrane comprises a hydrophobic polymer and a hydrophilic polymer, its permeability for pure water is 10 to 300 L/(h·m²·bar) and, when a 0.5% immunoglobulin solution is subjected to filtration at a constant pressure of 1.0 bar for 60 minutes in dead-end filtration mode, its filtration time and accumulated amount of recovered filtrate are substantially in a linear relation.

(2) that the central region of the membrane is composed of a substantially homogeneous structure, and the membrane wall is composed of a structure having no macrovoids, (3) that the inner diameter is 150 to 400 μm and the membrane thickness is 40 to 200 μm, (4) that the hydrophobic polymer is polysulfone-based polymers, (5) that the hydrophilic polymer is polyvinylpyrrolidone and (6) that it is a membrane to be used for the separation of virus from a protein solution.

Advantages of the Invention

The porous hollow fiber membrane for the treatment of a protein-containing liquid of the present invention can be utilized for the separation of virus from a protein solution and particularly can efficiently remove the virus and, at the same time, protein is efficiently permeated therethrough and the decrease of the permeation characteristics with elapse of time is small and, accordingly, it can be preferably utilized as a membrane for the removal of pathogenic substances such as virus from a solution of protein which is a useful ingredient during the steps for the manufacture of biopharmaceuticals and blood products.

DETAILED DESCRIPTION OF THE INVENTION

Figure 1:
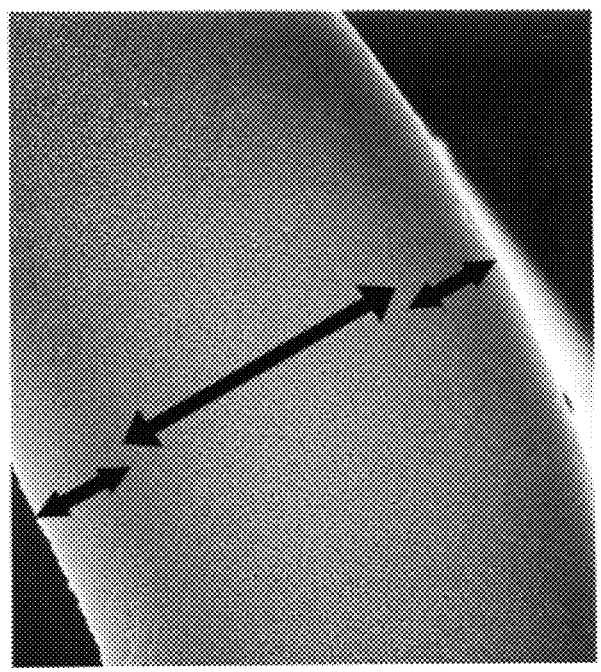
FIG. 1 is an example of the structure where the central area is substantially homogenous. The range shown by both arrows in the center of the image is "central region of membrane" while the ranges shown by both arrows on both sides are the inner side region and the outer side region of the membrane wall.

The present invention will now be illustrated in detail as hereunder.

It is preferred that the porous hollow fiber membrane for the treatment of a protein-containing liquid of the present invention comprises hydrophobic polymer and hydrophilic polymer. Examples of the hydrophobic polymer include polyester, polycarbonate, polyurethane, polyamide, polysulfone (hereinafter, it will be abbreviated as PSf), polyether sulfone (hereinafter, it will be abbreviated as PES), poly (methyl methacrylate), polypropylene, polyethylene and PVDF. Among them, polysulfone-based polymers such as PSf and PES having the repeating unit represented by the following [Formula 1] and [Formula 2] are advantageous for preparing a membrane having a high water permeating property and are preferred. The polysulfone-based polymers mentioned hereinabove may contain a substituent such as functional group and alkyl group and the hydrogen atom of the hydrocarbon backbone may be substituted with other atom such as halogen or substituents. They may be used either solely or by mixing two or more.

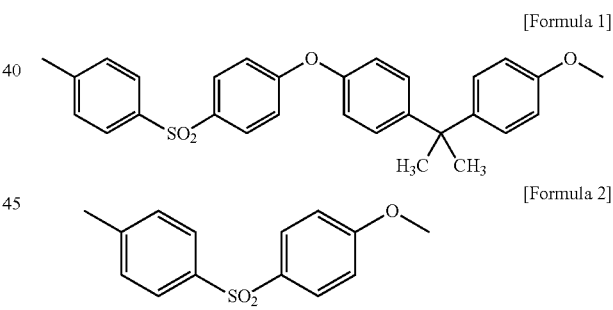

With regard to the hydrophilic polymer in the present invention, there may be exemplified polyethylene glycol, poly(vinyl alcohol), polyvinylpyrrolidone (hereinafter, it will be abbreviated as PVP), and macromolecular carbohydrate such as carboxymethyl cellulose and starch. Among them, PVP is preferred in view of its miscibility with a polysulfone-based polymers and its actual result in use as a membrane for the treatment of an aqueous fluid. Each of them may be used solely or two or more may be used as a mixture. The PVP having 17 to 120 as K value can be preferably used in terms of molecular weight. To be more specific, it is preferred to use the PVP being available from BASF, for example, Luvitec (trade name) K17, K30, K60, K80, K85 and K90, and more preferred to use Luvitec (trade name) K60, K80, K85 and K90.

The porous hollow fiber membrane for the treatment of a protein-containing liquid of the present invention is characterized in that its permeability for pure water (hereinafter, it will be abbreviated as pure water flux) is 10 to 300 L/(h·m²·bar). The pure water flux is an indication for showing the pore size of the porous membrane. When the pure water flux is smaller than the above value, the pore size becomes extremely small whereby it is difficult for efficiently permeating the protein. Further, since the permeated amount of water is small, the efficiency for recovering the filtrate lowers. When the pure water flux is more than the above value, the pore size becomes extremely big whereby it is difficult for efficiently separating and removing the substances to be removed such as virus. The pure water flux is preferred to be 40 to 230 L/(h·m²·bar) and more preferred to be 70 to 230 L/(h·m²·bar).

It is preferred that the protein which is an ingredient to be recovered in the filtrate shows a high permeation rate throughout the filtering process. Although it is difficult to unconditionally decide how much permeation rate is necessary in view of use, type, concentration, etc. of the protein, it is usually preferred to be 95% or more. When it is lower than 95%, loss of the protein by the filtration becomes big and the productivity lowers. In a membrane filtration, there is a possibility of a decrease in the permeation rate due to blocking when the filtration time becomes long. In view of the above, the permeation rate at the stage when the filtration is conducted for a sufficiently long time to the initial permeation rate at the filtering process (rate of retaining the permeation rate) is an index for showing the stability of the protein permeation with elapse of time. Taking the fact that there is a possibility of lowering the permeation rate with elapse of time and that the permeation rate is preferred to be always 90% or more throughout the whole filtering process into consideration, the rate of retaining the permeation rate is preferred to be 95% or more.

Here, although it is difficult to unconditionally decide the extent for "the stage when the filtration is conducted for a sufficiently long time" due to use, type, concentration, etc. of the protein, it will be rational to say that the stage is when a filtering load of at least one half of 50 L/m² or, in other words, about 25 L/m² is attained because, in a process for separating and removing the small-sized virus from a protein solution, it is usual that the maximum filtration load to the membrane is set at about 50 to 200 L/m². In addition, since it is the tendency in recent years that the concentration of the protein solution to be treated is becoming higher for a purpose of enhancing the productivity, it is rational to judge at the concentration of about 0.5% when the permeation property of protein is to be considered.

The porous hollow fiber membrane for the treatment of a protein-containing liquid of the present invention is characterized in that, when a 0.5% immunoglobulin solution is subjected to filtration at a constant pressure of 1.0 bar for 60 minutes in dead-end filtration mode, its filtration time and accumulated amount of recovered filtrate are substantially in a linear relation. It is general that, when a protein-containing liquid is filtered through a membrane, there is a tendency that the recovered amount of the filtrate tends to decrease with elapse of time due to clogging of the pores. In that case, when plotting is done using an abscissa for the filtration time and an ordinate for the accumulated amount of the recovered filtrate, both shows a curvilinear relation where the upside is convex. In such a membrane, permeated amount of the protein-containing liquid decreases whereby the filtering efficiency is bad and, moreover, it is impossible to estimate the filtration time for the filtration treatment of the liquid in a predetermined amount whereby the efficient operation is difficult and that is not preferred. Further, when deficiency is generated in the membrane during the filtration, recovering amount of the filtrate suddenly increases at that stage and, therefore, when plotting is done using an abscissa for the filtration time and an ordinate for the accumulated amount of the recovered filtrate, both shows a curvilinear relation where the downside is convex. If such an outcome is resulted, a substance which should be removed by filtration leaks out and that is not preferred. The fact that the filtration time and the accumulated amount of the recovered filtrate is in a linear relation means that the filtering characteristic in initial stage is retained in a stable manner even if the filtration is continued and further that no deficiency of the membrane is generated during the filtration. In a membrane having such a filtering characteristic, filtration time required for the filtering treatment of the liquid in a predetermined amount can be easily estimated and that is preferred in such a view that improvement in efficiency of the operation is expected. Further, since the filtering characteristic is stable, the separating characteristic in the initial stage of the filtration is retained even if the filtration is continued and it is preferred in such a view that separation of the recovered substance from the removed one is surely achieved.

In the present invention, the expression reading "substantially in a linear relation" means that the determinant coefficient $R^2$ of regression straight line obtained by a least-squares method from each point upon plotting of at least six points where the filtration time is on an abscissa while the accumulated amount of the recovered filtrate is on an ordinate is not less than 0.95. When the coefficient is less than that, it means that amount of the recovered filtrate decreases with elapse of time due to clogging by protein and that is not preferred. $R^2$ is 1 when the filtration time and the accumulated amount of the recovered filtrate are in a completely proportional relation and its maximum value is naturally 1. In order to make the relation between the filtration time and the amount of the recovered filtrate clear, the more the plotting numbers, the better but, in view of simplicity and convenience of the measurement, it is not preferred that they are too many. It is preferably 4 to 10 points, and more preferably 5 to 8 points. When they are less than that, reliability for $R^2$ is insufficient while, when they are more than that, the measurement is troublesome. Calculation of $R^2$ can be easily done by spreadsheet program using a personal computer. Thus, it is preferred to use this method.

Incidentally, the present invention is characterized in that the filtration time and the accumulated amount of recovered filtrate of an immunoglobulin solution are substantially in a linear relation. However, it is also possible that, with a prerequisite that the membrane area during the filtration is constant, the accumulated amount of recovered filtrate per unit membrane area (hereinafter, it will be referred to as "throughput") is used in place of the accumulated amount of recovered filtrate. When the throughput is used, it is now possible to compare the amounts of the recovered filtrate measured by different membrane areas in the same level whereby that is preferred.

It is necessary in the present invention to carry out a filtration experiment using a membrane for determining the relation between the filtration time and the accumulated amount of recovered filtrate when a 0.5% immunoglobulin solution is filtered at a constant pressure of 1.0 bar for 60 minutes in dead-end filtration mode. With regard to the immunoglobulin used at that time, it is preferred in view of easy availability and stable quality to use an intravenous immunoglobulin preparation (hereinafter, it will be referred to as IVIG) or, to be more specific, polyethylene glycol-treated human immunoglobulin such as Kenketsu Venoglobulin-IH Yoshitomi. In IVIG, there are an incomplete molecular type where fragment of immunoglobulin is an effective ingredient and a complete molecular type where immunoglobulin itself is an effective ingredient. In the present invention, it is preferred to use the latter. There are also a preparation where chemically-modified immunoglobulin is an effective ingredient and a preparation where non-modified immunoglobulin is an effective ingredient. In the present invention, it is preferred to use the latter. Usually, it is often that IVIG is supplied as a solution in a concentration of about 5% or as a kit wherefrom a solution in a concentration of about 5% can be prepared by dissolving the freeze-dried ingredient. In the present invention, it is preferred to use by diluting the above to 0.5%. As to a diluting liquid used therefor, a phosphate buffer saline (hereinafter, it will be abbreviated as "PBS") is preferred. The phosphate buffer saline (hereinafter, it will be abbreviated as "PBS") of the present invention means an isotonic saline to which buffer action is given by phosphate and its pH is preferred to be 6.5 to 7.5.

The filtration experiment for determining the relation between the filtration time and the accumulated amount of recovered filtrate of the immunoglobulin solution in the present invention is determined under the following measuring conditions. Liquid temperature is adjusted to 25° C.

(1) IVIG is diluted with PBS so as to make concentration 0.5% and pH is adjusted to 6.8.

(2) This solution is introduced into a hollow fiber membrane in a dry state and subjected to a constant-pressure filtration for 60 minutes with a filtering pressure of 1.0 bar.

(3) From the start of the filtration until the end, the filtration time and the amount of recovered filtrate are recorded with almost same intervals (such as 5 minutes, 10 minutes, 20 minutes, 30 minutes, 40 minutes, 50 minutes, and 60 minutes from the start of the filtration).

(4) The amount of the recovered filtrate is divided by the membrane area to calculate the throughput.

(5) Data of the filtration time and the throughout are inputted into a spreadsheet program on a personal computer to calculate $R^2$.

Figure 2:
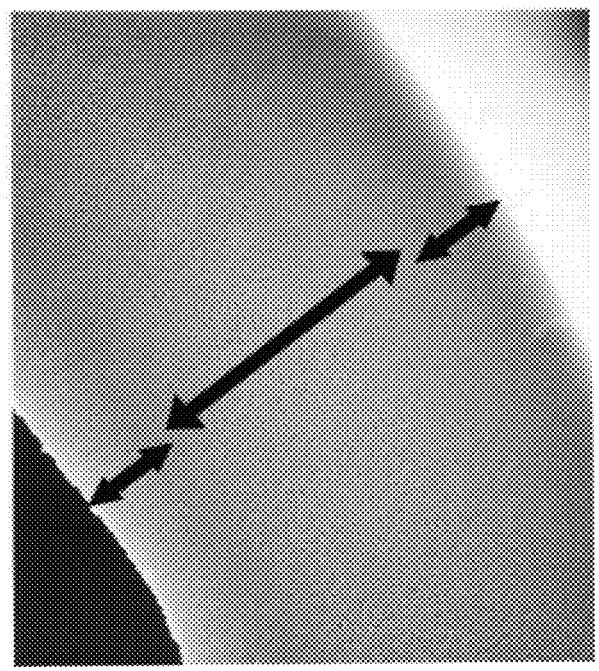
FIG. 2 is an example of the structure where the central area is substantially homogenous. The range shown by both arrows in the center of the image is "a central region of membrane" while the ranges shown by both arrows on both sides are the inner side region and the outer side region of the membrane wall.
Figure 3:
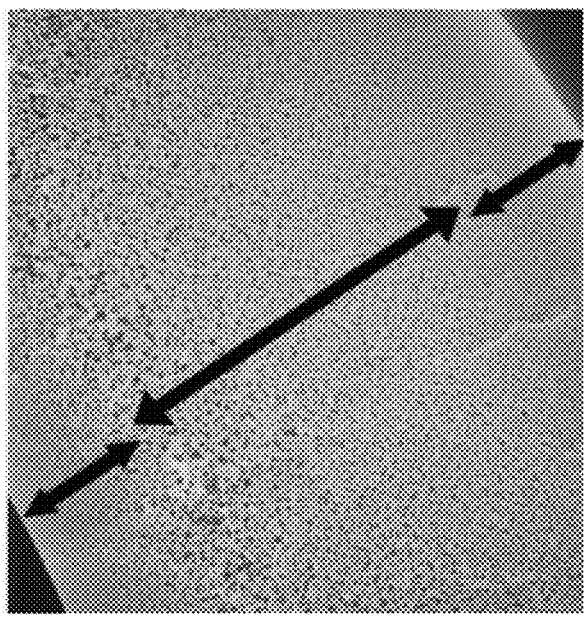
FIG. 3 is an example of the structure where the central region is not homogenous. The range shown by both arrows in the center of the image is "a central region of membrane" while the ranges shown by both arrows on both sides are the inner side region and the outer side region of the membrane wall.
Figure 4:
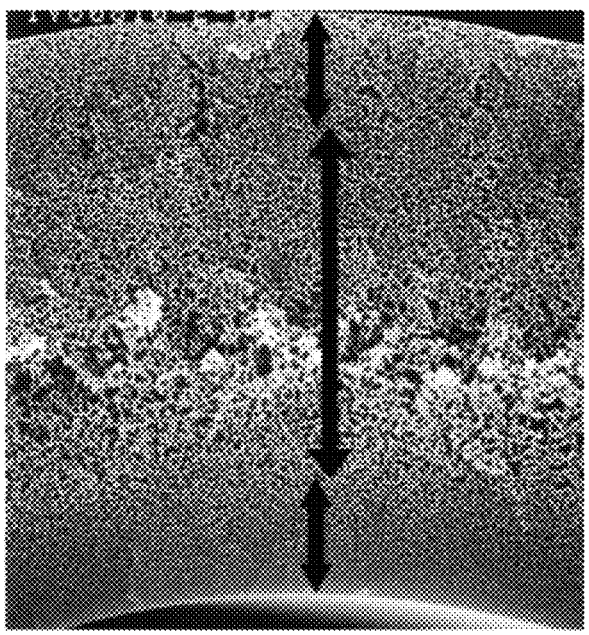
FIG. 4 is an example of the structure where the central region is not homogenous. The range shown by both arrows in the center of the image is "a central region of membrane" while the ranges shown by both arrows on both sides are the inner side region and the outer side region of the membrane wall.
Figure 5:
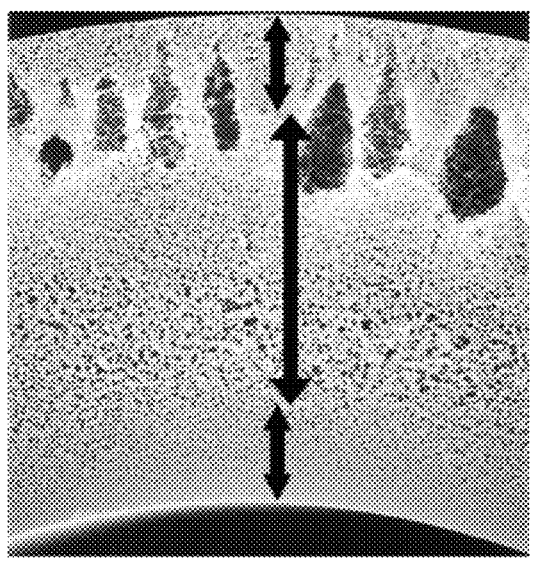
FIG. 5 is an example of the structure where the central region is not homogenous and has macrovoids. The range shown by both arrows in the center of the image is "a central region of membrane" while the ranges shown by both arrows on both sides are the inner side region and the outer side region of the membrane wall.

In the porous hollow fiber membrane for the treatment of a protein-containing liquid of the present invention, it is preferred that the central region of the membrane is composed of a substantially homogeneous structure and is also composed of a structure having substantially no macrovoids. "Central region of membrane" means a region between the position which is outer surface side from the inner surface in a distance corresponding to 20% of membrane thickness and the position which is inner surface side from the outer surface in a distance corresponding to 20% of membrane thickness and "substantially homogeneous structure" means that, when an SEM image in 100 magnifications is observed by naked eye, non-uniformity of the structure cannot be confirmed. To be more specific, the structure in FIGS. 1 and 2 is that which is meant by "the central region of the membrane is substantially homogeneous structure". In FIG. 3, the central region is in the order of rough-dense in the direction of from inside to outside; in FIG. 4, the central region is in the order of dense-rough-dense in the direction of from inside to outside; and, in FIG. 5, macrovoids are contained in the central region and, further, the rough-dense structure varies in a complicated manner. FIGS. 3-5 are the structures which are not preferred in the present invention. Incidentally, in FIGS. 1 to 5, the range shown by both arrows in the center of the image is "the central region of membrane" and the ranges shown by both arrows on both sides are the inside region and the outside region of membrane wall.

The expression reading "having no macrovoid" in the present invention means that, when SEM images (1,000 magnifications) by which five fields of the different regions of the membrane wall were taken are observed by naked eye, the pore region where the substantial part of the membrane is clearly deleted in a shape of circle, ellipse or liquid drop as compared with the homogeneous membrane wall or, in other word, the so-called macrovoid is not observed in any field.

It is preferred to utilize a homogeneous membrane for separating virus from a solution in which the things whose sizes are not extremely different from each other are co-existing (e.g. for separating and removing virus in a small size from a solution of immunoglobulin). That is because, when the homogeneous structure is applied in the thickness direction, an effect of pseudo-multistage can be expected such as that separation is repeatedly conducted in many layers. Moreover, as a result of utilization of such a structure, if and when a part of the membrane wall is deficient and trapping of the substance to be removed is not done at that place, there is a high possibility of stopping at any of the membrane wall whereby, as a whole membrane, risk of leak of the substance to be removed can be reduced. Due to the fact that the central region is in a homogeneous structure, the advantage as such can be achieved and it is suitable to remove the substance such as virus from a protein solution. Existence of macrovoid is not preferred since it makes the region by which such an effect can be expected narrow.

In the porous hollow fiber membrane for the treatment of a protein-containing liquid of the present invention, the filtration upstream side may be on the lumen of the hollow fiber membrane or on the outer wall side of the hollow fiber membrane and, in view of durability against the pressure applied in conducting the filtration, it is preferred to use the lumen of the hollow fiber membrane as the filtration upstream side and to filter from the inner side to the outer side of the hollow fiber membrane.

Inner diameter of the porous hollow fiber membrane for the treatment of a protein-containing liquid according to the present invention is preferred to be 100 to 1,000 μm, more preferred to be 120 to 800 μm, more preferred to be 150 to 400 μm, and more preferred to be 180 to 300 μm. Also, the membrane thickness is preferred to be 10 to 500 μm, more preferred to be 20 to 400 μm, more preferred to be 40 to 200 μm, and more preferred to be 50 to 100 μm. When the inner diameter is smaller than the above ranges, there may be the case where the loss of pressure by passing the liquid becomes big and the filtering pressure becomes non-uniform in the longitudinal direction of the hollow fiber membrane if the filtration is conducted from inside to outside. When a liquid to be treated containing much impurities and coagulating ingredients is introduced, there is a possibility that blocking of the lumen is resulted due to the ingredients in the liquid to be treated. When the inner diameter is larger than the above ranges, crushing, torsion, etc. of the hollow fiber membrane are apt to happen. When the membrane thickness is smaller than the above ranges, crushing, torsion, etc. of the hollow fiber membrane are apt to happen. When the membrane thickness is larger than the above ranges, it may happen that the resistance when the liquid to be treated passes the membrane wall become large and the permeating property lowers.

Bacteriophage clearance of the porous hollow fiber membrane for the treatment of protein-containing liquid of the present invention is preferred to be not less than 4 and more preferred to be not less than 5 in terms of LRV. As a result of having such a characteristic, it can be preferably applied to the use for the removal of virus from a protein-containing liquid. The "bacteriophage" mentioned hereinabove is preferred to be a bacteriophage having a diameter of 20 to 30 nm such as PP7 or φX174 and, in view of simplicity and convenience of handling of host bacteria, it is more preferred to be φX174.

There is no particular limitation at all for the method of manufacturing the porous hollow fiber membrane for the treatment of a protein-containing liquid of the present invention and an example thereof is a method where hydrophobic polymer, hydrophilic polymer, solvent and non-solvent are dissolved by mixing, foams are removed therefrom, the resulting one is used as a membrane-preparing solution, this solution and an inner liquid are discharged from the ring-shaped part and from the central part of a tube-in-orifice nozzle respectively at the same time and then introduced into a coagulating bath via an air gap part to form a hollow fiber membrane (a wet-and-dry spinning method) followed by washing with water, winding and drying.

With regard to a solvent used for the membrane-preparing solution, wide varieties thereof may be used so far as it is a good solvent for the hydrophobic polymer and the hydrophilic solvent such as, for example, N-methyl-2-pyrrolidone (hereinafter, it will be abbreviated as NMP), N,N-dimethylformamide (hereinafter, it will be abbreviated as DMF), N,N-dimethylacetamide (hereinafter, it will be abbreviated as DMAc), dimethyl sulfoxide (hereinafter, it will be abbreviated as DMSO) and ε-caprolactam. When polysulfone-based polymers such as PSf or PES are used as a hydrophobic polymer, an amide-type aprotic solvent such as NMP, DMF or DMAc is preferred and NMP is particularly preferred. The amide-type solvent in the present invention means a solvent containing an amide bond of N—C(=O) in its structure and the aprotic solvent means a solvent containing no hydrogen atom directly bonding to a hetero atom other than carbon atom in its structure.

It is preferred to add a non-solvent to the membrane-preparing solution. Examples of the usable non-solvent include ethylene glycol (hereinafter, it will be abbreviated as EG), propylene glycol (hereinafter, it will be abbreviated as PG), diethylene glycol (hereinafter, it will be abbreviated as DEG), triethylene glycol (hereinafter, it will be abbreviated as TEG), polyethylene glycol (hereinafter, it will be abbreviated as PEG), glycerol and water. When polysulfone-based polymers such as PSf or PES are used as a hydrophobic polymer and PVP is used as a hydrophilic polymer, an ether polyol such as DEG, TEG or PEG is preferred and TEG is particularly preferred. In the present invention, the ether polyol means a substance having at least one ether bond and two or more hydroxyl groups in its structure.

Although the detailed mechanism therefor is ambiguous, it is likely that, when a membrane-preparing solution prepared using the solvent and non-solvent as such is used, a phase separation (coagulation) in a spinning step is suppressed and it is advantageous to form the preferred membrane structure of the present invention. In controlling the phase separation, the compositions of the inner liquid and of the liquid in the coagulating bath (outer coagulating liquid) which will be mentioned later are also important.

The ratio of the solvent to the non-solvent in a membrane-preparing solution is an important factor for the control of the phase separation (coagulation) in a spinning step. It is preferred that the non-solvent is in the same amount as or in somewhat excessive amount to the solvent and, to be more specific, the ratio by weight of solvent/non-solvent is preferred to be from 25/75 to 50/50, more preferred to be from 30/70 to 50/50, and further preferred to be from 35/65 to 50/50. When the amount of the solvent is less than that, coagulation is apt to proceed and the membrane structure becomes too dense whereby the permeation property lowers. When the amount of the solvent is more than that, progress of the phase separation is excessively suppressed, pores in large diameter are apt to be generated and there is a possibility of resulting in the lowering of separation characteristics and strength. That is not preferred.

Although there is no particular limitation for the concentration of the hydrophobic polymer in the membrane-preparing solution so far as the preparation of the membrane from the solution is possible, it is preferred to be 10 to 40% by weight, more preferred to be 10 to 30% by weight, and further preferred to be 15 to 25% by weight. In order to achieve a high permeation property, the concentration of the hydrophobic polymer is preferred to be low but, when it is extremely low, there is a possibility of resulting in lowering of the strength and deterioration of the separating characteristics whereby it is preferred to be 15 to 25% by weight. Although there is no particular limitation for the adding amount of the hydrophilic polymer so far as it is an amount sufficient for giving hydrophilicity to the hollow fiber membrane and for suppressing the non-specific adsorption upon filtering the solution to be treated without causing the disadvantages for preparing the membrane from the membrane-preparing solution, it is preferred to be 2 to 15% by weight, more preferred to be 2 to 10% by weight, and further preferred to be 3 to 8% by weight in terms of the concentration of the hydrophilic polymer in the membrane-preparing solution. When the adding amount of the hydrophilic polymer is less than that, there is a possibility that the hydrophilicity is insufficiently given to the membrane whereby the retaining property of the membrane characteristics lowers. When it is more than that, an effect of giving the hydrophilicity is saturated whereby the efficiency is not good. In addition, the phase separation (coagulation) of the membrane-preparing solution is apt to excessively proceed whereby the operation ability becomes bad and, moreover, it is disadvantageous for forming the preferred membrane structure of the present invention.

The membrane-preparing solution can be obtained by mixing of hydrophobic polymer, hydrophilic polymer, solvent and non-solvent followed by stirring and dissolving. When appropriate temperature is applied at that time, dissolving can be efficiently done but, since an excessive heating has a risk of causing the degradation of the polymer, it is preferred to be 30 to 100° C. and more preferred to be 40 to 80° C. When PVP is used as a hydrophilic polymer, preparation of the membrane-preparing solution is preferred to be conducted together with filling the inert gas since PVP tends to result in oxidative degradation affected by oxygen in the air. Examples of the inert gas include nitrogen and argon and the use of nitrogen is preferred. At that time, it is preferred that the residual oxygen concentration in a dissolving tank is 3% or less.

Removal of foams from the membrane-preparing solution is effective for obtaining a hollow fiber membrane having no defect. As a method for suppressing the contamination of foams, it is effective to degas the membrane-preparing solution. Although it depends upon the viscosity of the membrane-preparing solution, degassing upon being allowed to stand or degassing in vacuo may be used therefor. In that case, the inner area of the dissolving tank is vacuated from "atmospheric pressure—0.015 MPa" to "atmospheric pressure—0.090 MPa" and then the tank is tightly closed followed by being allowed to stand for 30 to 180 minutes. This operation is repeated for several times to conduct the degassing treatment. When the vacuated degree is too low, long time may be needed for the treatment since the numbers of the degassing should be increased. When the vacuated degree is too high, the cost for rising the tightly closing degree of the system may become high. It is preferred that the total treating time is from 5 minutes to 5 hours. When the treating time is too long, the components constituting the membrane-preparing solution may be decomposed and deteriorated due to the affection of the low pressure. When the treating time is too short, the effect of degassing may be insufficient. It is also possible to adopt a method where a vacuum part is formed in a passage for introducing the membrane-preparing solution from a tank to a nozzle so that degassing is conducted together with running the membrane-preparing solution. The vacuum degree at that time is preferred to be from "atmospheric pressure—0.005 MPa" to "atmospheric pressure—0.030 MPa".

In preparing the membrane, it is preferred to use a membrane-preparing solution from which foreign matters are excluded so as to avoid generation of defect in the membrane structure due to contamination of foreign substances in the hollow fiber membrane. To be more specific, it is effective, for example, to use a material containing little foreign substances or to filter the membrane-preparing solution so as to decrease the foreign substances. In the present invention, it is preferred that a membrane-preparing solution is filtered through a filter having smaller pores than the membrane thickness of the hollow fiber membrane and then extruded from a nozzle. To be more specific, a uniformly dissolved membrane-preparing solution is passed through a sintered filter having a pore size of 10 to 50 µm installed during the passage from the dissolving tank to the nozzle. The filtering treatment may be conducted at least once. It is preferred in view of the filtering efficiency and of extending the filter life that, when the filtering treatment is conducted in plural steps, the pore size of a filter is made smaller in the latter stages. Pore size of the filter is more preferably 10 to 45 µm and further preferably 10 to 40 µm. When the filter pore size is too small, it may happen that the back pressure rises and the productivity lowers.

With regard to the composition of the inner liquid used in the preparation of the hollow fiber membrane, it is preferred to use a liquid where the solvent and/or the non-solvent contained in the membrane-preparing solution are/is the main component(s). However, in case the inner liquid consists of only a solvent contained in the membrane-preparing solution, coagulation on the lumen wall surface is excessively suppressed whereby it is impossible to give a preferred surface structure. Accordingly, it is preferred to use any of a mixed liquid of solvent and non-solvent, non-solvent only, a mixed liquid of solvent and water, a mixed liquid of non-solvent and water and a mixed liquid of solvent, non-solvent and water. The amount of the organic component contained in the inner liquid is preferred to be 50 to 100% by weight and more preferred to be 60 to 100% by weight. To be more specific, it is preferred that, in case the inner liquid is a mixed liquid of solvent and water, the amount of the organic component is made 50 to 65% by weight; in case the inner liquid is a mixed liquid of non-solvent and water, the amount of the organic component is made 60 to 100% by weight; and, in case the inner liquid is a mixed liquid of solvent, non-solvent and water, it is preferred to be made the same as the ratio of solvent/non-solvent of the membrane-preparing solution followed by diluting with water whereupon the concentration of the organic component is made 60 to 95% by weight. When the amount of the organic component is less than that, coagulation is apt to proceed and the membrane structure becomes too dense whereupon the permeation property lowers. When the amount of the organic component is more than that, progress of the phase separation is excessively suppressed and pores in large diameter are apt to be generated whereupon there is an increasing possibility of causing the lowering in the separation characteristics and the strength.

It is preferred that the composition of the outer coagulating liquid uses a mixed liquid of water with the solvent and non-solvent contained in a membrane-preparing solution. At that time, the rate of the solvent to the non-solvent contained in the outer coagulating liquid is preferably same as the rate of solvent/non-solvent in the membrane-preparing solution. Preferably, the solvent and non-solvent which are the same as those used for the membrane-preparing solution are mixed in the same rate as that in the membrane-preparing solution and water is added thereto to dilute. Amount of water in the outer coagulating liquid is 20 to 70% by weight and preferably 30 to 60% by weight. When the amount of water is more than that, coagulation is apt to proceed and the membrane structure becomes dense whereupon the permeation property lowers. When the amount of water is less than that, progress of the phase separation is excessively suppressed and pores in large diameter are apt to be formed whereupon there is a high possibility of resulting in the lowering of separation characteristic and strength. When temperature of the outer coagulating liquid is low, coagulation is apt to proceed and the membrane structure becomes too dense whereupon the permeation property may lower. When it is high, progress of phase separation is excessively suppressed and pores in large diameter are apt to be formed whereupon there is a high possibility of resulting in the lowering of separation characteristic and strength. Accordingly, the temperature is 40 to 70° C. and preferably 45 to 65° C.

One of the factors for controlling the membrane structure in the present invention is the nozzle temperature. When the nozzle temperature is low, coagulation is apt to proceed and the membrane structure becomes too dense whereby the permeation property lowers. When it is high, progress of the phase separation is excessively suppressed and pores in large diameter are apt to be formed whereupon there is a high possibility of resulting in the lowering of separation characteristic and strength. Accordingly, it is 30 to 85° C. and preferably 40 to 75° C.

An example of the preferred manufacturing method for obtaining the porous hollow fiber membrane for the treatment of a protein-containing liquid of the present invention is a wet-and-dry spinning method where a membrane-preparing solution extruded from a tube-in-orifice nozzle together with an inner liquid is introduced, via an air gap part, into a coagulating bath filled with an outer coagulating liquid to form a hollow fiber membrane. The retention time of the membrane-preparing solution extruded from the nozzle in the air gap part is one of the factors for controlling the membrane structure. When the retention time is short, quenching by the outer coagulating liquid is resulted under the state where the growth of the coagulated particles by the phase separation in the air gap part is suppressed whereby the outer surface becomes dense and the permeation property lowers. Moreover, there is a tendency that the resulting hollow fiber membrane is apt to be strongly adhered due to the densification of the outer surface. When the retention time is long, pores in large diameter are apt to be formed and there is a high possibility of causing the lowering of separation characteristic and strength. Preferred range of the retention time in the air gap is 0.01 to 2 second(s), more preferably 0.02 to 1 second, and further preferably 0.02 to 0.5 second.

Draft ratio in the air gap part and the coagulating bath or, in other words, ratio of the withdrawing rate from the coagulating bath to the extruding linear speed of a membrane-preparing solution from the tube-in-orifice nozzle is one of the factors for controlling the fine membrane structure and for controlling the permeation characteristic of the hollow fiber membrane. The draft ratio used here may be understood wholly as a draft ratio at the air gap part. It is likely that, when an appropriate draft is applied to the air gap in such a state where growth of coagulated particles due to phase separation is suppressed, orientation of polymer chain is optimized and that affects the fine structure of the membrane. In order to prepare the porous hollow fiber membrane for the treatment of a protein-containing liquid of the present invention, this draft ratio is made preferably 2~20, and more preferably 4~15. When the draft ratio is less than that, a decrease in the amount of the recovered filtrate with elapse of the filtration time is apt to become too big and there may be the case where the effect for removing the substance to be removed such as virus is hardly achieved in a sufficient level. When the draft ratio is more than that, breakage of the fiber is apt to happen and operation ability may lower.

The above-mentioned hollow fiber membrane which is introduced into a coagulating bath after an appropriate draft being applied in the air gap part with relatively short retention time contacts the outer coagulating liquid in such a state that the coagulation from outside is suppressed to some extent while coagulation from the inner liquid progresses. During course of passing through the outer coagulating liquid, coagulation of the hollow fiber membrane completely finishes and the structure is determined followed by being pulled out. The retention time in the coagulating bath is important for controlling the membrane structure and, to be more specific, it is preferred to be 1 to 15 second(s), more preferred to be 2 to 10 seconds and further preferred to be 2 to 5 seconds. When the retention time in the coagulating bath is shorter than that, coagulation is insufficient while, when it is longer than that, it is necessary to lower the membrane-preparing speed and to make the size of the coagulating bath large.

The hollow fiber membrane pulled out from the coagulating bath is introduced into a washing bath filled with warm water and washed with water under a heated state whereby a hollow fiber membrane having preferred separation characteristic, permeation characteristic and membrane structure can be prepared. At that time, there may be utilized a means where the membrane is intermittently dipped into warm water in the washing bath for several times according to the so-called Nelson roller running in which the reciprocation motion is conducted for several times between the constant-speed rollers installed in both ends of the washing bath. The hollow fiber membrane is repeatedly subjected to contacting with warm water and to contacting with air alternately by the Nelson roller running. The hollow fiber membrane somewhat shrinks together with a delicate drying by running in air and, since its speed is controlled by the constant-speed rollers, a delicate change in the tension is applied thereto. Although the detailed mechanism therefor is ambiguous, there will be a possibility that such delicate changes in tension and thermal hysteresis provide favorable influences. It is appropriate to set the contact with warm water by Nelson roller running at 5 to 15 times and preferably at 8 to 12 times, and to set the total retention time in warm water at 15 to 60 seconds and preferably at 20 to 45 seconds. Temperature of the warm water is preferred to be 30 to 100° C. and more preferred to be 40 to 90° C. When the temperature is lower than that, there is a high possibility that the washing effect is insufficient and, when it is higher than that, water cannot be used as a washing liquid.

Although there is no particular limitation for the membrane-preparing velocity (spinning speed) so far as a hollow fiber membrane without defect is obtained and the productivity is ensured, it is preferably 5 to 40 m/minute and more preferably 10 to 30 m/minute. When the spinning speed is lower than that, the productivity may lower. When the spinning speed is higher than that, it is difficult to secure the above-mentioned spinning conditions or, particularly, the retention time at the air gap part and the retention time in the coagulating bath.

In the hollow fiber membrane obtained via the online washing after preparation, it is preferred to subject to a heating treatment for a purpose of suppressing change of the membrane characteristic during the use and due to an washing operation and also of securing the retaining/stabilizing property of the membrane characteristics and the recovering property of the membrane characteristics. When the heating treatment is conducted by means of dipping into a hot water, the effect of washing and removing the solvent and the non-solvent being remained in the hollow fiber membrane can also be expected. In obtaining the porous hollow fiber membrane for the treatment of a protein-containing liquid of the present invention, a means may be used where, prior to this dipping operation into hot water, the aging is conducted by dipping the porous hollow fiber membrane to an aqueous solution of solvent/non-solvent. As a result of applying the aging as such, it is likely that the amount and the existing state of the hydrophilic polymer in the membrane are optimized whereby the permeation characteristics are optimized.

The dipping liquid in this step is diluted by water under the condition of same as the rate of solvent/non-solvent in the membrane-preparing solution, and it is preferred that the concentration of the organic component is 10 to 60% by weight. It is preferred that the temperature of dipping operation is 15 to 30° C. and that the dipping time is 10 to 180 minutes. When the concentration of the organic component is lower than that, the temperature is lower than that and the time is shorter than that, then the excessive hydrophilic polymer is apt to be remained and there is a possibility of resulting in the inconveniences such as changes in the membrane characteristics with elapse of time and the contamination of the liquid to be treated due to elution in actual use. When the concentration of the organic component is higher than that, the temperature is higher than that and the time is longer than that, there is then a possibility of resulting in the lowering of separating characteristics and strength due to the destruction of the surface structure of the lumen and the excessive extraction of the hydrophilic polymer.

The temperature of hot water used for the heating treatment of the hollow fiber membrane after the above aging is 40 to 100° C., more preferably 60 to 95° C. and the treating time is 30 to 90 minutes, more preferably 40 to 80 minutes and more preferably 50 to 70 minutes. When the temperature is lower than that and the treating time is shorter than that, there is a possibility that the thermal hysteresis applied to the hollow fiber membrane is insufficient whereupon the retaining property and the stability of the membrane characteristics lower and that the washing effect is insufficient whereupon the eluted things increase. When the temperature is higher than that and the treating time is longer than that, water may boil or long time may be needed for the treatment whereby the productivity may lower. Although there is no particular limitation for the bath ratio of the hollow fiber membrane to hot water so far as there is used the hot water of an amount in which the hollow fiber membrane is sufficiently dipped. However, the use of too much water results in a possibility of lowering the productivity. When the hollow fiber membrane is made into bundles of appropriate length followed by dipping into hot water in a upright state during this heating treatment, the hot water is apt to reach the part of the lumen and that is preferred in view of the heating treatment and the washing effect.

It is preferred that the porous hollow fiber membrane for the treatment of a protein-containing liquid of the present invention is treated with hot water of high pressure immediately after the above heating treatment. To be more specific, it is preferred to set in a high-pressure steam sterilizer in a state of being dipped in water and to treat under the conventional high-pressure steam sterilizing condition which is the treating temperature at 120 to 140° C. and the treating time for 20 to 120 minutes. At that time, it is preferred that the above hollow fiber membrane where the heating treatment finishes is promptly subjected to the treatment with high-pressure hot water just in the wet state and just in the high-temperature state. Although the detailed mechanism therefor is ambiguous, temperature of the membrane rises by the heating treatment, the membrane becomes to a "loosened" state, and the high-pressure hot-water treatment is further conducted under such a "loosened" state whereby it is likely that the excessive hydrophilic polymer is removed and, at the same time, the existing state is optimized whereupon the permeation characteristics are optimized. When the treating temperature is lower than the above range or the treating time is shorter than that, the treating condition is too mild whereupon the removal of the excessive hydrophilic polymer and the optimization of the existing state are insufficient and, as a result, there is a high possibility of causing the inconveniences such as changes in the membrane characteristics with elapse of time and contamination of the liquid to be treated due to elution in actual use. When the treating temperature is higher than the above range or the treating time is longer than that, the treating condition is severe whereupon there is a possibility of lowering the separation characteristics and the strength due to the destruction of the membrane structure and also to the excessive extraction of the hydrophilic polymer.

In order to prepare a porous hollow fiber membrane for the treatment of a protein-containing liquid of the present invention, an additive may be added to a dipping liquid used for the above high-pressure hot-water treatment. The additive is preferred to be a substance having an antioxidant effect and a radical trapping effect such as sulfite or polyhydric alcohol. Although the detailed mechanism therefor is ambiguous, it is likely that progress of thermal cross-linking of hydrophilic polymer by a high-pressure hot-water treatment is controlled and, at the same time, its existing state is optimized whereby the permeation characteristic is optimized. Its adding amount varies depending upon the type of the additive and is 0.01 to 1%, and preferably 0.01 to 0.1% in the case of sulfite, and 0.1 to 20%, and preferably 1 to 10% in the case of polyhydric alcohol. When the amount is less than that, contribution to optimization of the permeation characteristic is small and, when it is more than that, eluted things from the resulting membrane increase and any of them is not preferred. It is also possible that, after the high-pressure hot-water treatment under such a state that the additive is added, the above treatment with hot water is conducted once again whereupon the additive is washed and removed.

When the hollow fiber membrane where membrane preparation, heating treatment and high-pressure hot-water treatment finish is dried, it is finally completed. As to a method for drying, a commonly used means such as drying with air, drying in vacuo, hot-wind drying or microwave drying can be widely utilized. Especially, a microwave drying which has been utilized recently for drying, etc. of the membrane for the treatment of blood is preferably used because large amount of hollow fiber membrane can be efficiently dried at relatively low temperature. The temperature of drying is room temperature to 70° C. and preferably 30 to 65° C. When the temperature is lower than that, long time is needed until being dried while, when it is higher than that, energy cost for generating the hot wind becomes high whereby any of them is not favorable. When the hollow fiber membrane is dried to an extent of absolutely dried state, it is difficult to keep the preferred permeation characteristic due to degradation of the hydrophilic polymer and migration whereby it is preferred to set the drying condition so as to make the water content after the drying treatment 1~8% and preferably 2~6%. When the water content is lower than that, it is difficult to achieve the preferred permeation characteristic while, when it is higher than that, there may be the case where wetness is high and handling ability becomes bad.

EXAMPLES

Efficacy of the present invention will now be illustrated by way of the following Examples although the present invention is not limited thereto. Incidentally, methods for the evaluation in the following Examples are as shown below.

1. Measurement of the Water Content of the Hollow Fiber Membrane

A hollow fiber membrane bundle prepared by spinning and after-treatment was used and water content of the hollow fiber membrane was calculated by the following formula [1].

$$\text{water content of the hollow fiber membrane } [\%] = 100 \times (W1 + W2)/W1 \qquad [1]$$

In the formula, W1 is weight (g) of the hollow fiber membrane bundle prepared by spinning and after-treatment; and W2 is weight (g) of a hollow fiber membrane bundle in an absolutely dry state prepared by drying the above hollow fiber membrane bundle for 2 hours using a dry heat oven of 120° C.

2. Preparation of Mini-Module

The hollow fiber membrane was cut into a size of about 30 cm and both ends were bundled using a paraffin film to prepare a hollow fiber membrane bundle. Both ends of this hollow fiber membrane bundle were inserted into a pipe (sleeve) and hardened using a urethane potting agent. The terminal parts were cut to give a mini-module having openings at both ends wherein the both ends were fixed with sleeves. Numbers of the hollow fiber membrane were appropriately set so as to make the surface area of the inner surface 30 to 50 cm².

3. Preparation of Mini-Module Equipped with the Outer Shell

A cylindrical chip and another cylindrical chip having a side port were attached on an end of the tube (about 15 cm length) made of poly(vinyl chloride) and on another end thereof, respectively. One to five hollow fiber membrane(s) cut into the size of about 15 cm was/were inserted into the above tube made of poly(vinyl chloride) equipped with the chips in both ends and then the chip parts on both ends were covered with a silicone adhesive in such a manner that the lumen of the hollow fiber membrane were not clogged. When liquid is introduced from the chip part of the end to the lumen of the hollow fiber membrane in this mini-module equipped with the outer shell, it is possible to filter in the direction of from the lumen of the hollow fiber membrane to the outer surface (filtration from inside to outside) and, when liquid is introduced from the side port, it is also possible to filter in the direction of from the outer wall to the lumen (filtration from outside to inside).

4. Calculation of the Membrane Area

Membrane area of the module was determined on the basis of the diameter of the inside of the hollow fiber membrane. The membrane area A [m$^2$] can be calculated by the following formula [2].

$$A = n \times \pi \times d \times L \quad [2]$$

In the formula, n is numbers of the hollow fiber membrane, π is ratio of the circumference of a circle to its diameter, d is inner diameter [m] of the hollow fiber membrane and L is an effective length [m] of the hollow fiber membrane in the module.

5. Measurement of the Pure Water Flux

A circuit was connected to two terminal sleeves (each of them will be referred to as inlet for lumen and outlet for lumen) of the mini-module so that the flow-in pressure of the liquid into the mini-module and the flow-out pressure of the liquid from the mini-module could be measured. Pure water was placed in a pressure tank, kept at 25° C. and introduced into the inlet for lumen of the mini-module together with controlling the filtering pressure to about 1.0 bar using a regulator so as to fill the pure water in the lumen of the hollow fiber membrane. The circuit (downstream side from the point for measuring the pressure) connected to the outlet for lumen was blocked with a forceps to stop the flow so that all of the pure water flown thereinto from the inlet for lumen of the module was filtered. Pure water was continuously sent to the mini-module, filtration was carried out for 30 seconds and priming of the membrane was conducted. The filtrate during the priming treatment was discarded. After that, the amount of the filtrate obtained from the outside of the hollow fiber membrane was recovered within two minutes and its amount was measured. Further, the pressure Pi at the inlet for lumen and the pressure Po at the outlet for lumen during the filtration were measured and the difference in the pressure between the membranes (TMP) ΔP was calculated by the following formula [3]

$$\Delta P = (Pi + Po)/2 \quad [3]$$

The pure water flux [L/(h·m$^2$·bar)] was calculated by the following formula [4] from filtration time t [h], TMP ΔP [bar], membrane area of the mini-module A [m$^2$] and amount of the filtrate V [L].

$$\text{Pure water flux} = V/t/A/\Delta P \quad [4]$$

6. Permeation Test for Immunoglobulin

Dulbecco PBS(−) powder "Nissui" (9.6 g) commercially available from Nissui Seiyaku was dissolved in distilled water to make the total volume 1,000 mL whereupon PBS was prepared. Kenketsu Venoglobulin-1H Yoshitomi commercially available from Tanabe-Mitsubishi Pharmaceutical was diluted with the above buffer and adjusted to pH 6.8 using a 1 mol/L aqueous solution of sodium hydroxide. Concentration of immunoglobulin after the dilution and the pH adjustment was adjusted to make 0.5%. (Hereinafter, this solution will be abbreviated as IVIG/PBS.) A circuit was connected to two terminal chips (each of them will be referred to as inlet for lumen and outlet for lumen) of the mini-module equipped with an outer shell so that introduction and discharge of the liquid into and from the lumen of the hollow fiber membrane were made possible. Measurement of flow-in pressure of the liquid was made possible at the liquid inlet side. The IVIG/PBS was placed in a pressure tank, kept at 25° C. and introduced into the lumen of the mini-module equipped with an outer shell together with controlling the pressure using a regulator so as to make the filtering pressure 1.0 bar. The filtrate obtained from the outer side of the hollow fiber membrane was recovered from the side pipe of the tip. The filtrate was received by changing a container at each stage of 5 minutes, 10 minutes, 20 minutes, 30 minutes, 40 minutes, 50 minutes and 60 minutes (the stage from n minutes from the start of the filtration is called "Tn"). At that time, amount of the recovered filtrate in each fraction was read from the value shown in an electron balance. The throughput until the Tn stage (TPn [L/m$^2$]) was calculated by the following formula [5].

$$TPn = Wn/1.0/A/1000 \quad [5]$$

In the formula, W is the total amount [g] of the amount of the recovered filtrate until the fraction of the stage of n minutes from the start of the filtration; 1.0 is density (g/cc) of the IVIG/PBS; and A is a membrane area [m$^2$] of the module.

7. Analysis of the Relation Between the Filtration Time of Immunoglobulin and the Accumulated Amount of Recovered Filtrate (Throughput)

Data of the filtration time Tn obtained in the above filtration test and of the throughput TPn until the stage of its filtration time were inputted into a spreadsheet program (Microsoft Excel) in a personal computer to calculate R$^2$.

8. Measurement of Permeation Rate of Immunoglobulin

Permeation rate P of immunoglobulin was calculated, using the following formula [6], from the filtrate of each fraction obtained in the above filtration test and the IVIG/PBS which is a liquid to be filtered.

$$P = 100[\%] \times (\text{protein concentration in the filtrate})/(\text{protein concentration in the liquid to be filtered IVIG/PBS}) \quad [6]$$

Here, with regard to the protein concentrations in the liquid to be filtered IVIG/PBS and in the filtrate, the absorbance at 280 nm was measured and the concentrations were calculated from a calibration curve prepared from an immunoglobulin solution of known concentration.

9. Measurement of Clearance Index for a Bacteriophage ϕX174

(1) Preparation of a Phage Liquid for the Test

Albumin from bovine serum (Product No. A2153) commercially available from Sigma Aldrich Japan was dissolved in PBS prepared by the already-mentioned method so as to make the concentration 0.1% by weight whereupon a 0.1% by weight solution of BSA (hereinafter, it will be just called a BSA solution) was obtained. A freeze-stored and concentrated liquid containing ϕX174 (titer: 1 to 10×10$^9$ pfu/mL) was thawed and diluted to an extent of 100 times using the BSA solution. It was further filtered through a membrane filter of 0.1 μm pore size to remove the coagulated component, etc. and used as a phage liquid for the test.

(2) Filtering Test Using the Phage Liquid for the Test

A circuit was connected to two terminal chips (each of them will be referred to as inlet for lumen and outlet for lumen) of the mini-module equipped with an outer shell so that introduction and discharge of the liquid into and from the lumen of the hollow fiber membrane were made possible. Measurement of flow-in pressure of the liquid was made possible at the liquid inlet side. The liquid outlet side was blocked with a forceps to stop the flow so that all of the liquid flown thereinto from the inlet for the lumen of the module could be filtered. The phage liquid for the test was placed in a pressure tank, kept at 25° C. and introduced into the lumen of the mini-module equipped with an outer shell together with controlling the pressure using a regulator so as to make the filtering pressure 1.0 bar. The filtrate obtained from the outside of the hollow fiber membrane was recovered from the side port of the chip. Filtration was conducted until 50 L of the filtrate per $m^2$ of the outer surface of the hollow fiber membrane was obtained.

(3) Measurement of Phage Titer of the Phage Liquid for the Test and the Filtrate

*Escherichia coli* was suspended in a 10 mM aqueous $MgSO_4$ solution so that the absorbance at 660 nm was made 4.0 (hereinafter, it will be called as *E. coli* liquid). Further, agar medium and top agar were prepared and warmed at 50° C. Particularly for top agar, careful attention was paid for keeping its fluidity. A liquid (10 μL) prepared by appropriately diluting the phage liquid for the test with the BSA solution was mixed with the 50 μL of the *E. coli* liquid followed by incubating at 37° C. for 20 minutes whereupon *E. coli* was infected by the phage. After completion of the incubation, all of the mixed liquid was mixed with 3 mL of top agar and the whole amount was developed onto an agar medium. After the top agar was completely solidified on the agar medium, incubation was conducted at 37° C. for 2 to 4 hours. After completion of the incubation, the plaque numbers on the agar medium were counted and, taking the diluting rate into consideration, phage titer of the phase liquid for the test (hereinafter, it will be abbreviated as Tpre) [pfu/ml] was calculated. Phage titer of the filtrate (hereinafter, it will be abbreviated as Tpost) was also obtained by the same means.

(4) Calculation of Phage Clearance Index of the Hollow Fiber Membrane

A phage clearance index of the hollow fiber membrane was calculated by the following formula [7]. In the formula, Tpre [pfu/mL] means phage titer of the phage liquid for the test introduced into the hollow fiber membrane for the evaluation and Tpost [pfu/mL] means the titer of phage filtrate obtained by filtering the phage liquid for the test through a hollow fiber membrane for the test.

$$\text{Phage clearance index } [LRV] = \log_{10}(T\text{pre}/T\text{post}) \quad [7]$$

10. Measurement of Clearance Index of Bacteriophage φX174 Under a High Load

The filtrate was recovered by the same method as mentioned above as from the stage where the filtered amount per 1 $m^2$ of the hollow fiber membrane area exceeded 200 L. This recovered filtrate was used to determine the phage clearance index in accordance with the above method.

Example 1

PES (Ultrason (trade name) manufactured by BASF, E6020P) (20 parts by weight), 6 parts by weight of PVP (Luvitec (trade name) manufactured by BASF, K90PH), 33.3 parts by weight of NMP manufactured by Mitsubishi Chemical and 40.7 parts by weight of TEG manufactured by Mitsui Chemical were mixed and dissolved at 55° C. for 6 hours to give a uniform solution. At that time, the inside of the system was substituted with nitrogen by conducting vacuation and introduction of nitrogen for several times and, under a tightly close state, preparation of the solution was conducted. After preparing the solution, it was vacuated at 55° C. to an extent of "atmospheric pressure—0.09 MPa" and, after that, the inside of the system was tightly sealed immediately so as to prevent the changes in the solution composition caused by evaporation of the solvent, etc. followed by being allowed to stand for 30 minutes to degas. Further, the solution was continuously degassed in a vacuated part formed in the passage connecting to a nozzle from a tank and then introduced into a nozzle. At that time, temperature of the passage was 55° C. and vacuated degree of the vacuated area was "atmospheric pressure—0.015 MPa".

The above membrane-preparing solution was extruded from a ring-shaped part of a tube-in-orifice nozzle while a mixture of 38.25 parts by weight of NMP, 46.75 parts by weight of TEG and 15 parts by weight of RO water was extruded as an inner liquid from the central part and, via an air gap of 15 mm, it was introduced into a coagulating bath filled with an outer coagulating liquid comprising a mixture of 27 parts by weight of NMP, 33 parts by weight of TEG and 40 parts by weight of RO water. At that time, temperatures of the nozzle and the outer coagulating liquid were set at 55° C. and 60° C., respectively. The hollow fiber membrane pulled out from the coagulating bath was introduced into a water bath filled with warm water of 55° C., subjected to Nelson roller running for ten times, pulled out and wound around a winding machine.

Spinning speed was 22.2 m/min, running length of the hollow fiber membrane in a coagulating bath was 900 mm and retention time in the coagulating bath was 2.43 seconds. The running length was set so as to make the retention time in the water bath 30 seconds. Extruding amounts of the membrane-preparing solution and the inner liquid were controlled so as to make inner diameter and membrane thickness of the hollow fiber membrane about 200 μm and about 60 μm, respectively. Retention time of the hollow fiber membrane in the air gap part calculated from the above conditions was 0.04 second. Draft ratio was 10.5.

The wound hollow fiber membrane was made into a bundle comprising 2280 membranes with 35 cm length and, after removing the inner liquid therefrom, it was promptly dipped in a mixture of 22.5 parts by weight of NMP, 27.5 parts by weight of TEG and 50 parts by weight of RO water at 25° C. for 60 minutes. After that, the dipping liquid was discarded therefrom followed by subjecting to a treatment with hot water by dipping into RO water of 80° C. for 60 minutes in an upright state. The hollow fiber membrane where the heating treatment finished being in a wet state was promptly dipped into warm water of 40° C. placed in a high-pressure steam sterilizer and subjected to a high-pressure hot-water treatment under the condition of 132° C. for 20 minutes. At that time, glycerol was previously added to the warm water so as to make its concentration 1% by weight. Liquid was discarded from the hollow fiber membrane for which a high-pressure hot-water treatment in 1% by weight aqueous solution of glycerol finished and then the membrane in a wet state was dipped into warm water of 40° C. placed in a high-pressure steam sterilizer followed by subjecting to a high-pressure hot-water treatment once again under the condition of 134° C. for 20 minutes.

Further, each 12 of 24 hollow fiber membrane bundles were placed on two rotating tables, placed in a microwave drying device, irradiated with 1.5 kW of microwave together with vacuating the inside of the drying device until 7 kPa and subjected to a drying treatment for 36 minutes. After that, the microwave output was set to 0.8 kW, a drying treatment was conducted for 18 minutes in vacuo (7 kPa), the microwave output was lowered to 0.4 kW and the drying for 8 minutes finished. The highest reaching temperature of the hollow fiber membrane surface in the drying step was 60° C. and the water content of the dried hollow fiber membrane was 3.3%. As a result of the above steps, there was obtained a hollow fiber membrane (A) having inner diameter of 198 μm and membrane thickness of 59 μm.

Figure 6:
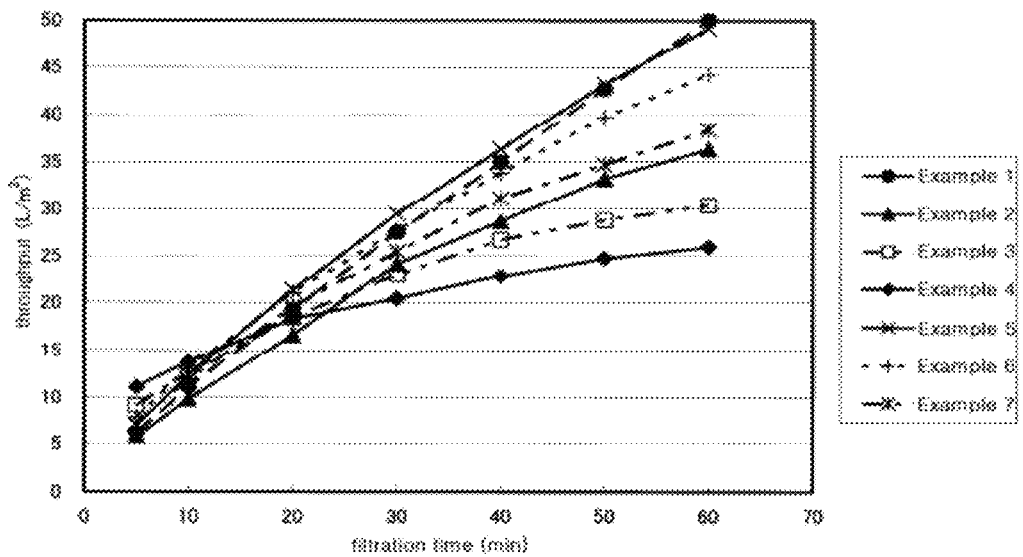
FIG. 6 is a graph showing the relation between the throughout and the filtration time of immunoglobulin measured by a hollow fiber membrane prepared in Examples 1 to 7.

When observation was done under an SEM, the central region of thick part of the hollow fiber membrane (A) was in a structure having substantially uniform quality and the thick part was in a structure having no macrovoid. Pure water flux of the hollow fiber membrane (A) was measured according to the already-mentioned method and a permeation test of immunoglobulin was carried out. Relation between the filtration time of immunoglobulin and the throughput was analyzed from the resulting data according to the already-mentioned method. Characteristics and properties of the hollow fiber membrane (A) are shown in Table 1 all together. Relation between the filtration time of immunoglobulin and the throughput is shown in FIG. 6.

Permeation rate of immunoglobulin was measured by the already-mentioned method using a filtrate at each of the stages where filtration time was 5 minutes and 60 minutes obtained in the permeation test of immunoglobulin conducted by the already-mentioned method. The results are shown in Table 1 all together under P5 and P60, respectively.

Clearance index of bacteriophage ϕX174 per 1 m² of hollow fiber membrane area at the stage where filtration load amount was 50 L (hereinafter, it will be abbreviated as ϕX174-CL50) and clearance index of bacteriophage ϕX174 per 1 m² of hollow fiber membrane area at the stage where filtration load amount was 200 L (hereinafter, it will be abbreviated as ϕX174-CL200) were measured according to the already-mentioned method. The results are shown in Table 1 all together.

Example 2

The same operation as in Example 1 was conducted except that a drying method was changed whereupon a hollow fiber membrane (B) was prepared. The hollow fiber membrane (B) was obtained by means of drying according to the following method. Twenty-four hollow fiber membrane bundles wherein a high-pressure hot-water treatment finished were placed on a shelf board and dried by passing warm wind of 60° C. for 6 hours therethrough. The highest reaching temperature of the hollow fiber membrane surface during the drying step and the water content of the dried hollow fiber membrane were 60° C. and 2.4%, respectively. Characteristics and properties of the hollow fiber membrane (B) are shown in Table 1 together with P5 and P60 as well as ϕX174-CL50 and ϕX174-CL200 measured by the same method as in Example 1. Relation between the filtration time of immunoglobulin and the throughput is shown in FIG. 6.

Example 3

The same operation as in Example 1 was conducted except that draft ratio was changed to 4.2 whereupon a hollow fiber membrane (C) was prepared. The highest reaching temperature of the hollow fiber membrane surface during the drying step and the water content of the dried hollow fiber membrane were 60° C. and 3.1%, respectively. Characteristics and properties of the hollow fiber membrane (C) are shown in Table 1 together with P5 and P60 as well as ϕX174-CL50 and ϕX174-CL200 measured by the same method as in Example 1. Relation between the filtration time of immunoglobulin and the throughput is shown in FIG. 6.

Example 4

The same operation as in Example 1 was carried out except that constitution of the membrane-preparing liquid was changed to 19 parts by weight of PES (Ultrason (trade name) manufactured by BASF, E6020P), 6 parts by weight of PVP (Luvitec (trade name) manufactured by BASF, K90PH), 33.75 parts by weight of NMP33 manufactured by Mitsubishi Chemical and 41.25 parts by weight of TEG manufactured by Mitsui Chemical, nozzle temperature was made 53° C., constitution of the outer coagulating liquid was changed to a mixture of 18 parts by weight of NMP, 22 parts by weight of TEG and 60 parts by weight of RO water, temperature of the outer coagulating liquid was set at 50° C., air gap length was made 30 mm, and retention time of the hollow fiber membrane at the air gap part was made 0.08 second whereupon a hollow fiber membrane (D) was prepared. The highest reaching temperature of the hollow fiber membrane surface during the drying step and the water content of the dried hollow fiber membrane were 60° C. and 3.6%, respectively. Characteristics and properties of the hollow fiber membrane (D) are shown in Table 1 together with P5 and P60 as well as ϕX174-CL50 and ϕX174-CL200 measured by the same method as in Example 1. Relation between the filtration time of immunoglobulin and the throughput is shown in FIG. 6.

Example 5

The same operation as in Example 1 was carried out except that constitution of the membrane-preparing liquid was changed to 20 parts by weight of PES (Sumika Excel (trade name) manufactured by Sumitomo Chemtech, 5200P), 6 parts by weight of PVP (Luvitec (trade name) manufactured by BASF, K90PH), 33.3 parts by weight of NMP manufactured by Mitsubishi Chemical and 40.7 parts by weight of TEG manufactured by Mitsui Chemical, nozzle temperature was made 53° C., and constitution of the outer coagulating liquid was changed to a mixture of 18 parts by weight of NMP, 22 parts by weight of TEG and 60 parts by weight of RO water whereupon a hollow fiber membrane (E) was prepared. The highest reaching temperature of the hollow fiber membrane surface during the drying step and the water content of the dried hollow fiber membrane were 60° C. and 2.9%, respectively. Characteristics and properties of the hollow fiber membrane (E) are shown in Table 1 together with P5 and P60 as well as ϕX174-CL50 and ϕX174-CL200 measured by the same method as in Example 1. Relation between the filtration time of immunoglobulin and the throughput is shown in FIG. 6.

Example 6

The same operation as in Example 1 was carried out except that constitution of the membrane-preparing liquid was changed to 20 parts by weight of PSf (P-3500 manufactured by Amoco), 6 parts by weight of PVP (Luvitec (trade name) manufactured by BASF, K90PH), 33.3 parts by weight of NMP manufactured by Mitsubishi Chemical and 40.7 parts by weight of TEG manufactured by Mitsui Chemical, nozzle temperature was made 56° C., and constitution of the outer coagulating liquid was changed to a mixture of 18 parts by weight of NMP, 22 parts by weight of TEG and 60 parts by weight of RO water whereupon a hollow fiber membrane (F) was prepared. The highest reaching temperature of the hollow fiber membrane surface during the drying step and the water content of the dried hollow fiber membrane were 60° C. and 3.6%, respectively. Characteristics and properties of the hollow fiber membrane (F) are shown in Table 1 together with P5 and P60 as well as φX174-CL50 and φX174-CL200 measured by the same method as in Example 1. Relation between the filtration time of immunoglobulin and the throughput is shown in FIG. 6.

Example 7

PES (Ultrason (trade name) manufactured by BASF, E6020P) (20 parts by weight), 6 parts by weight of PVP (Luvitec (trade name) manufactured by BASF, K90PH), 33.3 parts by weight of NMP manufactured by Mitsubishi Chemical and 40.7 parts by weight of TEG manufactured by Mitsui Chemical were mixed and dissolved at 55° C. for 6 hours to give a uniform solution. At that time, the inside of the system was substituted with nitrogen by conducting vacuation and introduction of nitrogen for several times and, under a tightly close state, preparation of the solution was conducted. After preparing the solution, it was vacuated at 55° C. to an extent of "atmospheric pressure—0.09 MPa" and, after that, the inside of the system was tightly sealed immediately so as to prevent the changes in the solution composition caused by evaporation of the solvent, etc. followed by being allowed to stand for 30 minutes to degas. Further, the solution was continuously degassed in a vacuated part formed in the passage connecting to a nozzle from a tank and then introduced into a nozzle. At that time, temperature of the passage was 55° C. and vacuated degree of the vacuated area was "atmospheric pressure—0.015 MPa".

The above membrane-preparing solution was extruded from a ring-shaped part of a tube-in-orifice nozzle while a mixture of 38.25 parts by weight of NMP, 46.75 parts by weight of TEG and 15 parts by weight of RO water was extruded as an inner liquid from the central part and, via an air gap of 15 mm, it was introduced into a coagulating bath filled with an outer coagulating liquid comprising a mixture of 27 parts by weight of NMP, 33 parts by weight of TEG and 40 parts by weight of RO water. At that time, temperatures of the nozzle and the outer coagulating liquid were set at 55° C. and 60° C., respectively. The hollow fiber membrane pulled out from the coagulating bath was introduced into a water bath filled with warm water of 55° C., subjected to a running once, pulled out and wound around a winding machine.

Spinning speed was 22.2 m/min, running length of the hollow fiber membrane in a coagulating bath was 900 mm and retention time in the coagulating bath was 2.43 seconds. The running length was set so as to make the retention time in the water bath 11 seconds. Extruding amounts of the membrane-preparing solution and the inner liquid were controlled so as to make inner diameter and membrane thickness of the hollow fiber membrane about 200 μm and about 60 μm, respectively. Retention time of the hollow fiber membrane in the air gap part calculated from the above conditions was 0.04 second. Draft ratio was 10.5.

The wound hollow fiber membrane was made into a bundle comprising 2280 membranes with 35 cm length and, after removing the inner liquid therefrom, it was subjected to a treatment with hot water by dipping into RO water of 80° C. for 60 minutes in an upright state. The hollow fiber membrane where the heating treatment finished being in a wet state was promptly dipped into warm water of 40° C. placed in a high-pressure steam sterilizer and subjected to a high-pressure hot-water treatment under the condition of 132° C. for 20 minutes. Liquid was discarded from the hollow fiber membrane for which a first high-pressure hot-water treatment finished and then the membrane in a wet state was dipped into warm water of 40° C. placed in a high-pressure steam sterilizer followed by subjecting to a high-pressure hot-water treatment once again under the condition of 134° C. for 20 minutes.

Further, each 12 of 24 hollow fiber membrane bundles were placed on two rotating tables, placed in a microwave drying device, irradiated with 1.5 kW of microwave together with vacuating the inside of the drying device until 7 kPa and subjected to a drying treatment for 36 minutes. After that, the microwave output was set to 0.8 kW, a drying treatment was conducted for 18 minutes in vacuo (7 kPa), the microwave output was lowered to 0.4 kW and the drying for 8 minutes finished. The highest reaching temperature of the hollow fiber membrane surface in the drying step was 60° C. and the water content of the dried hollow fiber membrane was 3.2%. As a result of the above steps, there was obtained a hollow fiber membrane (G) having inner diameter of 203 μm and membrane thickness of 61 μm. Characteristics and properties of the hollow fiber membrane (G) are shown in Table 1 together with P5 and P60 as well as φX174-CL50 and φX174-CL200 measured by the same method as in Example 1. Relation between the filtration time of immunoglobulin and the throughput is shown in FIG. 6.

Comparative Example 1

Figure 7:
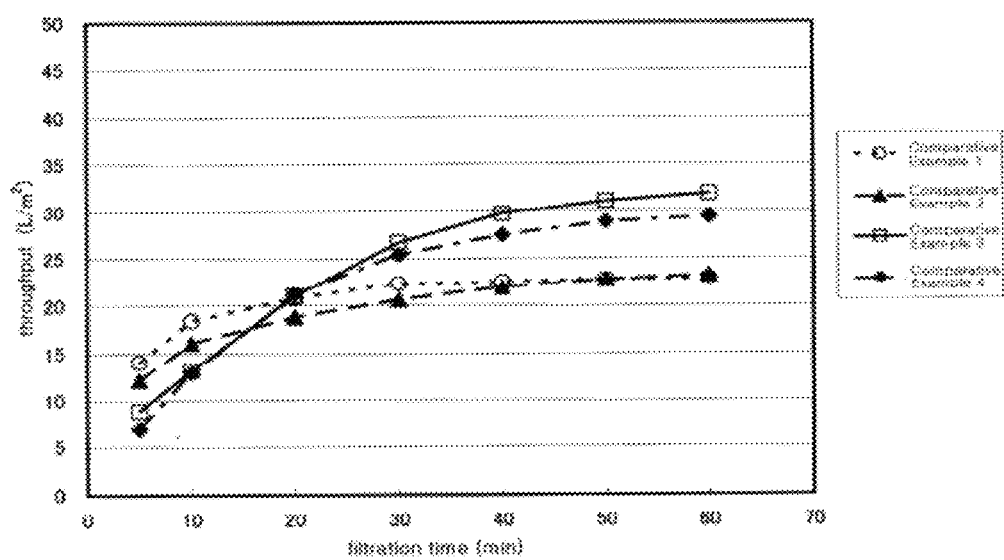
FIG. 7 is a graph showing the relation between the throughout and the filtration time of immunoglobulin measured by a hollow fiber membrane prepared in Comparative Examples 1 to 4.

The same operation as in Example 1 was carried out except that constitution of the membrane-preparing liquid was changed to 20 parts by weight of PES (Ultrason (trade name) manufactured by BASF, E6020P), 1 part by weight of PVP (Luvitec (trade name) manufactured by BASF, K90PH), 35.55 parts by weight of NMP manufactured by Mitsubishi Chemical and 43.45 parts by weight of TEG manufactured by Mitsui Chemical, nozzle temperature was made 60° C., the outer coagulating liquid was changed to RO water, the hollow fiber membrane was subjected to a running once in a washing tab without the Nelson roller running in a washing tab, and retention time of the hollow fiber membrane at a washing tab was made 3 seconds whereupon a hollow fiber membrane (H) was prepared. The highest reaching temperature of the hollow fiber membrane surface during the drying step and the water content of the dried hollow fiber membrane were 60° C. and 3.0%, respectively. Characteristics and properties of the hollow fiber membrane (H) are shown in Table 2 together with P5 and P60 as well as φX174-CL50 and φX174-CL200 measured by the same method as in Example 1. Relation between the filtration time of immunoglobulin and the throughput is shown in FIG. 7.

Comparative Example 2

The same operation as in Comparative Example 1 was carried out except that constitution of the membrane-preparing liquid was changed to 20 parts by weight of PES (Ultrason (trade name) manufactured by BASF, E6020P), 3 parts by weight of PVP (Luvitec (trade name) manufactured by BASF, K90PH), 34.65 parts by weight of NMP manufactured by Mitsubishi Chemical and 42.35 parts by weight of TEG manufactured by Mitsui Chemical, the inner liquid was changed to a mixture of 1 part by weight of NMP and 4 parts by weight of TEG, the outer coagulating liquid was changed to a mixture of 27 parts by weight of NMP, 33 parts by weight of TEG and 40 parts by weight of RO water, and temperature of the outer coagulating liquid was set at 55° C. whereupon a hollow fiber membrane (I) was prepared. The highest reaching temperature of the hollow fiber membrane surface during the drying step and the water content of the dried hollow fiber membrane were 60° C. and 3.0%, respectively. Characteristics and properties of the hollow fiber membrane (I) are shown in Table 2 together with P5 and P60 as well as φX174-CL50 and φX174-CL200 measured by the same method as in Example 1. Relation between the filtration time of immunoglobulin and the throughput is shown in FIG. 7.

Comparative Example 3

The same operation as in Example 1 was conducted except that no glycerol was added to the dipping liquid for the first high-pressure hot-water treatment and that a drying method was changed whereupon a hollow fiber membrane (J) was prepared. The hollow fiber membrane (J) was obtained by means of drying according to the following method. Thus, 24 hollow fiber membrane bundles in which a high-pressure hot-water treatment finished were placed on a shelf board and dried by passing warm wind of 80° C. therethrough for 20 hours. The highest reaching temperature of the hollow fiber membrane surface during the drying step and the water content of the dried hollow fiber membrane were 80° C. and 0.2%, respectively. Characteristics and properties of the hollow fiber membrane (J) are shown in Table 2 together with P5 and P60 as well as φX174-CL50 and φX174-CL200 measured by the same method as in Example 1. Relation between the filtration time of immunoglobulin and the throughput is shown in FIG. 7.

Comparative Example 4

PES (Ultrason (trade name) manufactured by BASF, E6020P) (20 parts by weight), 6 parts by weight of PVP (Luvitec (trade name) manufactured by BASF, K90PH), 33.3 parts by weight of NMP manufactured by Mitsubishi Chemical and 40.7 parts by weight of TEG manufactured by Mitsui Chemical were mixed and dissolved at 55° C. for 6 hours to give a uniform solution. At that time, the inside of the system was substituted with nitrogen by conducting vacuation and introduction of nitrogen for several times and, under a tightly close state, preparation of the solution was conducted. After preparing the solution, it was vacuated at 55° C. to an extent of "atmospheric pressure—0.09 MPa" and, after that, the inside of the system was tightly sealed immediately so as to prevent the changes in the solution composition caused by evaporation of the solvent, etc. followed by being allowed to stand for 30 minutes to degas. Further, the solution was continuously degassed in a vacuated part formed in the passage connecting to a nozzle from a tank and then introduced into a nozzle. At that time, temperature of the passage was 55° C. and vacuated degree of the vacuated area was "atmospheric pressure—0.015 MPa".

The above membrane-preparing solution was extruded from a ring-shaped part of a tube-in-orifice nozzle while a mixture of 38.25 parts by weight of NMP, 46.75 parts by weight of TEG and 15 parts by weight of RO water was extruded as an inner liquid from the central part and, via an air gap of 20 mm, it was introduced into a coagulating bath filled with an outer coagulating liquid comprising a mixture of 26.1 parts by weight of NMP, 31.9 parts by weight of TEG and 42 parts by weight of RO water. At that time, temperatures of the nozzle and the outer coagulating liquid were set at 55° C. and 55° C., respectively. The hollow fiber membrane pulled out from the coagulating bath was introduced into a water bath filled with warm water of 55° C., subjected to a running once in a washing tab without the Nelson roller running, pulled out and wound around a winding machine.

Spinning speed was 18.0 m/min, running length of the hollow fiber membrane in a coagulating bath was 2,000 mm and retention time in the coagulating bath was 6.67 seconds. The running length was set so as to make the retention time in the water bath 11 seconds. Extruding amounts of the membrane-preparing solution and the inner liquid were controlled so as to make inner diameter and membrane thickness of the hollow fiber membrane about 280 μm and about 80 μm, respectively. Retention time of the hollow fiber membrane in the air gap part calculated from the above conditions was 0.05 second. Draft ratio was 2.0.

The wound hollow fiber membrane was made into a bundle comprising 2280 membranes with 35 cm length and, without removing the inner liquid therefrom, it was stood for 60 minutes at 25° C. for aging. After that, the dipping liquid was discarded therefrom followed by subjecting to a treatment with hot water by dipping into RO water of 85° C. for 60 minutes in an upright state. The hollow fiber membrane where the heating treatment finished being in a wet state was promptly dipped into warm water of 40° C. placed in a high-pressure steam sterilizer and subjected to a high-pressure hot-water treatment under the condition of 132° C. for 20 minutes.

After finishing the high-pressure hot-water treatment, 24 hollow fiber membrane bundles were placed on a shelf board and dried by passing warm wind of 60° C. therethrough for 16 hours. The highest reaching temperature of the hollow fiber membrane surface during the drying step and the water content of the dried hollow fiber membrane were 60° C. and 1.8%, respectively. As a result of the above steps, there was obtained a hollow fiber membrane (K) having inner diameter of 198 μm and membrane thickness of 59 μm. Characteristics and properties of the hollow fiber membrane (K) are shown in Table 2 together with P5 and P60 as well as φX174-CL50 and φX174-CL200 measured by the same method as in Example 1. Relation between the filtration time of immunoglobulin and the throughput is shown in FIG. 7.

TABLE 1

|  | Example 1 | Example 2 | Example 3 | Example 4 | Example 5 | Example 6 | Example 7 |
| --- | --- | --- | --- | --- | --- | --- | --- |
| hollow fiber membrane | (A) | (B) | (C) | (D) | (E) | (F) | (G) |
| inner diameter (μm) | 198 | 201 | 198 | 201 | 196 | 204 | 203 |
| membrane thickness (μm) | 59 | 60 | 62 | 59 | 58 | 63 | 61 |
| central region of membrane | substantially homogeneous structure | substantially homogeneous structure | substantially homogeneous structure | substantially homogeneous structure | substantially homogeneous structure | substantially homogeneous structure | substantially homogeneous structure |

TABLE 1-continued

|  | Example 1 | Example 2 | Example 3 | Example 4 | Example 5 | Example 6 | Example 7 |
|---|---|---|---|---|---|---|---|
| macrovoids | substantially macrovoid-free | substantially macrovoid-free | substantially macrovoid-free | substantially macrovoid-free | substantially macrovoid-free | substantially macrovoid-free | substantially macrovoid-free |
| pure water flux (L/h/m²/bar) | 91 | 88 | 127 | 215 | 108 | 119 | 90 |
| filtration time-throughput determinant coefficient $R^2$ value of regression straight line | 0.999 | 0.979 | 0.953 | 0.951 | 0.993 | 0.989 | 0.976 |
| relation between the filtration time and the accumulated amount of the recovered filtrate | substantially in a linear relation | substantially in a linear relation | substantially in a linear relation | substantially in a linear relation | substantially in a linear relation | substantially in a linear relation | substantially in a linear relation |
| P5 (%) | 99.2 | 99.4 | 98.9 | 98.4 | 99.0 | 98.8 | 98.2 |
| P60 (%) | 97.8 | 97.2 | 96.4 | 95.3 | 97.2 | 96.4 | 95.4 |
| φX174-CL50 (LRV) | >5.0 | >5.0 | >5.0 | >5.0 | >5.0 | >5.0 | >5.0 |
| φX174-CL200 (LRV) | >5.0 | >5.0 | >5.0 | >5.0 | >5.0 | >5.0 | >5.0 |

TABLE 2

|  | Comparative Example 1 | Comparative Example 2 | Comparative Example 3 | Comparative Example 4 |
|---|---|---|---|---|
| hollow fiber membrane | (H) | (I) | (J) | (K) |
| inner diameter (μm) | 204 | 200 | 199 | 281 |
| membrane thickness (μm) | 62 | 59 | 60 | 79 |
| central region of membrane | existing rough parts and dense parts | substantially homogeneous structure | substantially homogeneous structure | substantially homogeneous structure |
| macrovoids | substantially macrovoid-free | substantially macrovoid-free | substantially macrovoid-free | substantially macrovoid-free |
| pure water flux (L/h/m²/bar) | 602 | 324 | 154 | 118 |
| filtration time-throughput determinant coefficient $R^2$ value of regression straight line | 0.695 | 0.863 | 0.893 | 0.844 |
| relation between the filtration time and the accumulated amount of the recovered filtrate | substantially not in a linear relation | substantially not in a linear relation | substantially not in a linear relation | substantially not in a linear relation |
| P5 (%) | 90.8 | 96.6 | 97.4 | 98.3 |
| P60 (%) | 40.2 | 89.5 | 91.8 | 92.6 |
| φX174-CL50 (LRV) | 0.8 | 1.2 | 3.8 | 4.2 |
| φX174-CL200 (LRV) | 0.8 | 0.8 | 2.4 | 3.6 |

From the result of permeation rate of immunoglobulin (P5) when filtration time was 5 minutes and also from the result of permeation rate of immunoglobulin (P60) when filtration time was 60 minutes, it is understood that the protein efficiently permeates through the porous hollow fiber membrane for the treatment of protein-containing liquid according to the present invention and that the lowering of the permeation rate with elapse of time is small. Further from the result of φX174 phage clearance index (φX174-CL50) when filtration load amount was 50 L/m² and also from the result of φX174 phage clearance index (φX174-CL200) when filtration load amount was 200 L/m², good bacteriophage-removing ability is achieved not only in the case of low filtration load but also in the case of high filtration load. It is likely that the specific filtration characteristic and membrane structure which are characteristic features of the present invention contribute in achievement of those excellent characteristics. On the other hand, as will be apparent from the result of Comparative Examples, any of the protein permeation and the bacteriophage-removing ability is insufficient when any of the constitutions of specific filtering characteristic and membrane structure is not fulfilled.

Since pore size of the membrane tends to become large when pure water flux is excessively high, sufficient bacteriophage-removing ability is hardly achieved. Further, when the relation between the filtration time of immunoglobulin solution and the throughput (equivalent to the accumulated amount of recovered filtrate) is not in a linear relation, it is likely that clogging of the membrane with elapse of time proceeds and, as a result, it is likely that P60 becomes a low value. As shown in the result of Comparative Example 4, lowering of the bacteriophage-removing ability upon high filtration load was noted. Although cause and mechanism why this phenomenon is noted are not clear, the following hypothesis will be thinkable for example.

It is likely that, unlike common filtering membranes, not only size separation but also some type of interaction between membrane surface and virus may contribute in the separation of virus (or bacteriophage) using a porous membrane. In a membrane which generates clogging with elapse of time when a protein solution is filtered, it is likely that the interaction with protein is not well suppressed. In such a membrane, it is likely that such a contradictory phenomenon at a glance occurs that the co-existing protein results in an interaction with the membrane surface when a virus (or bacteriophage)-containing liquid is filtered, that interaction between membrane and virus (or bacteriophage) is inhibited, and that, as a result, leak of virus (or bacteriophage) is generated in a membrane where clogging is apt to proceed.

INDUSTRIAL APPLICABILITY

The porous hollow fiber membrane for the treatment of a protein-containing liquid of the present invention has such advantages that it can efficiently separate and remove the substances to be removed such as small-particle virus contained in a solution and, at the same time, useful recovering substances such as protein can be efficiently permeated and the decrease in the permeation characteristics thereof with elapse of time is small. It is particularly useful for the removal of virus from a protein solution and greatly contributes in industry.

The invention claimed is:

1. A porous hollow fiber membrane for the treatment of a protein-containing liquid comprising a hydrophobic polymer and a hydrophilic polymer, wherein the porous hollow fiber membrane has a permeability for pure water of 10 to 230 L/(h·m²·bar) and, when a 0.5% immunoglobulin solution is subjected to filtration at a constant pressure of 1.0 bar for 60 minutes in dead-end filtration mode, filtration time and accumulated amount of recovered filtrate are substantially in a linear relation, wherein the porous hollow fiber membrane draft ratio is 4-15.

2. The porous hollow fiber membrane for the treatment of a protein-containing liquid according to claim 1, wherein the central region of the porous hollow fiber membrane is composed of a substantially homogeneous structure, and the porous hollow fiber membrane wall is composed of a structure having no macrovoids.

3. The porous hollow fiber membrane for the treatment of a protein-containing liquid according to claim 1, wherein the inner diameter is 150 to 400 μm and the porous hollow fiber membrane thickness is 40 to 200 μm.

4. The porous hollow fiber membrane for the treatment of a protein-containing liquid according to claim 1, wherein the hydrophobic polymer is polysulfone-based polymer.

5. The porous hollow fiber membrane for the treatment of a protein-containing liquid according claim 1, wherein the hydrophilic polymer is polyvinylpyrrolidone.

6. The porous hollow fiber membrane for the treatment of a protein-containing liquid according to claim 1, wherein the porous hollow fiber membrane is capable of separating a virus from a protein solution, and wherein the virus is removed from the protein solution.

7. The porous hollow fiber membrane for the treatment of a protein-containing liquid according to claim 1, wherein the hydrophobic polymer is polysulfone-based polymers and the hydrophilic polymer is polyvinylpyrrolidone.

8. The porous hollow fiber membrane for the treatment of a protein-containing liquid according to claim 1, wherein the inner diameter is 150 to 400 μm and the porous hollow fiber membrane thickness is 50 to 200 μm.

9. The porous hollow fiber membrane for the treatment of a protein-containing liquid according to claim 1, wherein the hydrophobic polymer is selected from the group consisting of polyester, polycarbonate, polyurethane, polyamide, polysulfone, polyether sulfone, poly(methyl methacrylate), polypropylene, polyethylene and poly(vinylidene fluoride).

10. The porous hollow fiber membrane for the treatment of a protein containing liquid according to claim 1, wherein the permeability for pure water is 70 to 230 L/(h·m2·bar).

* * * * *